US011102144B2

(12) United States Patent
Jutori et al.

(10) Patent No.: US 11,102,144 B2
(45) Date of Patent: Aug. 24, 2021

(54) SUPPORT APPARATUS AND METHOD

(71) Applicant: Hitachi, Ltd., Tokyo (JP)

(72) Inventors: Hiroyoshi Jutori, Tokyo (JP);
Tomohiro Morimura, Tokyo (JP);
Satoshi Kaneko, Tokyo (JP); Shinichi Hayashi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/014,109

(22) Filed: Sep. 8, 2020

(65) Prior Publication Data
US 2021/0105223 A1  Apr. 8, 2021

(30) Foreign Application Priority Data

Oct. 4, 2019 (JP) .............................. JP2019-184052

(51) Int. Cl.
*G06F 15/173* (2006.01)
*H04L 12/911* (2013.01)
*H04L 12/24* (2006.01)
*H04L 12/927* (2013.01)

(52) U.S. Cl.
CPC ........ *H04L 47/781* (2013.01); *H04L 41/0816* (2013.01); *H04L 41/0886* (2013.01); *H04L 41/22* (2013.01); *H04L 47/808* (2013.01); *H04L 47/828* (2013.01)

(58) Field of Classification Search
CPC ... H04L 47/781; H04L 47/808; H04L 47/828; H04L 41/0816; H04L 41/0886; H04L 41/22
See application file for complete search history.

(56) References Cited

U.S. PATENT DOCUMENTS

2018/0183679 A1   6/2018 Firment et al.

*Primary Examiner* — Wing F Chan
*Assistant Examiner* — Joseph R Maniwang
(74) *Attorney, Agent, or Firm* — Mattingly & Malur, PC

(57) ABSTRACT

A support apparatus and method are capable of facilitating work to optimize deployment locations of information processing resources and are respectively allocated to one or more allocation targets. A deployment location candidate is calculated, which is an appropriate deployment location of each of the information processing resources allocated to each of the allocation targets, and a reducible cost is determined when the information processing resource is allocated to the deployment location candidate, with respect to each information processing resource. The reducible cost is displayed when the deployment of the information processing resource allocated to the allocation target is optimized, and the importance of the allocation target is determined by associating the reducible cost with the importance of the allocation target with respect to each allocation target on the basis of the calculation result of the reducible cost for each information processing resource.

14 Claims, 26 Drawing Sheets

FIG. 3

IT RESOURCE CONFIGURATION
INFORMATION MANAGEMENT TABLE 33

| RESOURCE ID | BU ID | APP ID | MENU ID | CAPACITY |
|---|---|---|---|---|
| Resource0 | Bu0 | App0 | Menu001 | — |
| Resource1 | Bu1 | App1 | Menu012 | — |
| Resource2 | Bu0 | App0 | Onpr030 | 1.00[GB] |
| Resource3 | Bu1 | App2 | Menu121 | 2.00[GB] |
| Resource4 | Bu0 | App3 | Menu108 | — |
| Resource5 | Bu1 | App2 | Onpr104 | — |
| ... | ... | ... | ... | ... |

IT RESOURCE PERFORMANCE INFORMATION MANAGEMENT TABLE 34

| RESO-URCE ID | PAST ONE-MONTH AVERAGE UTILIZA-TION RATE | PAST ONE-MONTH LOWEST UTILIZA-TION RATE | PAST ONE-MONTH HIGHEST UTILIZA-TION RATE | INBOUND COMMU-NICATION SOURCE 1 | INBOUND COMMU-NICATION TRAFFIC VOLUME 1 | ... | OUTBOUND COMMUNI-CATION DESTI-NATION 1 | OUTBOUND COMMUNI-CATION TRAFFIC VOLUME 1 | ... | ACQUI-SITION TIME |
|---|---|---|---|---|---|---|---|---|---|---|
| Resource0 | 40.5% | 8.1% | 67.5% | Resource1 | 120GB | ... | Resource1 | 85GB | ... | 2019/4/1 00:00:00 |
| Resource1 | 89.1% | 63.3% | 100.0% | Resource0 | 85GB | ... | Resource0 | 120GB | ... | 2019/4/1 00:00:00 |
| Resource2 | 7.0% | 5.2% | 14.8% | Resouce0 | 10GB | ... | Resouce0 | 200GB | ... | 2019/4/1 00:00:00 |
| ... | ... | ... | ... | ... | ... | ... | ... | ... | ... | ... |
| 34A | 34B | 34C | 34D | 34E | 34F | | 34G | 34H | | 34I |

FIG. 5
IT RESOURCE MENU INFORMATION MANAGEMENT TABLE 35

| MENU ID | RESOURCE CLASS | CLOUD ID | REGION ID | SERVICE CLASS | SERVICE TYPE | UNIT PRICE | QUANTITY OF CPU'S | CPU CLOCK [GHZ] | MEMORY SIZE [GB] |
|---|---|---|---|---|---|---|---|---|---|
| Menu000 | Compute | Public0 | Region0 | On-Demand | C-0-2 | 0.016 | 2 | 2.3 | 4 |
| Menu001 | Compute | Public0 | Region1 | Reserved | C-1-4 | 0.021 | 4 | 3.6 | 8 |
| Menu010 | Storage | Public0 | Region0 | Block | B-0-1 | 0.012 | - | - | - |
| Menu011 | Storage | Public0 | Region0 | Block | B-2-1 | 0.015 | - | - | - |
| Menu020 | Network | Public0 | Region0 | Internet Gateway | N-1 | 0 | - | - | - |
| Menu021 | Network | Public0 | Region0 | VPN Connect | N-2 | 0.05 | - | - | - |
| ... | ... | ... | ... | ... | ... | ... | ... | ... | ... |
| 35A | 35B | 35C | 35D | 35E | 35F | 35G | 35H | 35I | 35J |

| RESOURCE STORAGE TYPE | VOLUME SIZE [GB] | NETWORK BANDWIDTH [GBPS] | MAXIMUM IOPS | DESIGNATED VOLUME UNIT | MAXIMUM VOLUME SIZE | INBOUND UNIT PRICE | OUTBOUND UNIT PRICE |
|---|---|---|---|---|---|---|---|
| NVMe SSD | 200 | 10 | - | - | - | - | - |
| - | - | 25 | - | - | - | - | - |
| - | - | - | 1000 | 1 | 2000 | - | - |
| - | - | - | 1000 | 1 | 2000 | - | - |
| - | - | - | - | - | - | 0 | 0.2 |
| - | - | - | - | - | - | 0 | 0.14 |
| ... | ... | ... | ... | ... | ... | ... | ... |
| 35K | 35L | 35M | 35N | 35O | 35P | 35Q | 35R |

FIG. 6

ON-PREMISES ASSET INFORMATION MANAGEMENT TABLE 36

| MENU ID | RESOURCE CLASS | ON-PREMISES ID | ASSET PURCHASE PRICE [M$] | ASSET PURCHASE MONTH | ASSET'S DURABLE YEARS | ASSET'S MAXIMUM ELECTRIC POWER CONSUMPTION |
|---|---|---|---|---|---|---|
| Onpr000 | Compute | Private0 | 20.0 | 201606 | 60 | 900 |
| Onpr001 | Compute | Private0 | 35.0 | 201710 | 60 | 900 |
| Onpr030 | Storage | Private0 | 150.0 | 201704 | 60 | 1600 |
| Onpr031 | Storage | Private0 | 200.0 | 201802 | 60 | 1600 |
| ... | ... | ... | ... | ... | ... | ... |
| 36A | 36B | 36C | 36D | 36E | 36F | 36G |

| QUANTITY OF CPU'S | CPU CLOCK [GHZ] | MEMORY SIZE [GB] | RESOURCE STORAGE TYPE | VOLUME SIZE [GB] | MAXIMUM IOPS | DESIGNATED VOLUME UNIT | MAXIMUM VOLUME SIZE | UNIT PRICE [$] |
|---|---|---|---|---|---|---|---|---|
| 16 | 2.3 | 4 | - | - | - | - | - | 0.23 |
| 24 | 3.6 | 8 | NVMe SSD | 200 | - | - | - | - |
| - | - | - | - | - | 1000 | 1 | 200000 | - |
| - | - | - | - | - | 1000 | 1 | 2000 | - |
| ... | ... | ... | ... | ... | ... | ... | ... | ... |
| 36H | 36I | 36J | 36K | 36L | 36M | 36N | 36O | 36P |

FIG. 7

IT RESOURCE DEPLOYMENT LOCATION CANDIDATE MANAGEMENT TABLE 37

| RESOURCE ID | BU ID | APP ID | CURRENT DEPLOYMENT LOCATION ID | CURRENT MENU ID | POST-MIGRATION DEPLOYMENT LOCATION ID | POST-MIGRATION REGION ID | POST-MIGRATION MENU ID | CURRENT MONTHLY USAGE FEE | POST-MIGRATION MONTHLY USAGE FEE | MONTHLY USAGE FEE DIFFERENCE | MINIMUM COST |
|---|---|---|---|---|---|---|---|---|---|---|---|
| Resource0 | Bu0 | App0 | Private0 | Menu 001 | Private0 | — | Onpr 001 | $40.00 | $35.00 | -$5.00 | No |
| Resource0 | Bu0 | App0 | Private0 | Menu 001 | Public0 | Region0 | Menu 102 | $40.00 | $28.00 | -$12.00 | Yes |
| Resource0 | Bu0 | App0 | Private0 | Menu 010 | Public1 | Region0 | Menu 201 | $40.00 | $30.00 | -$10.00 | No |
| Resource1 | Bu0 | App1 | Public1 | Menu 103 | Private0 | — | Onpr 004 | $80.00 | $56.00 | -$24.00 | Yes |
| Resource1 | Bu0 | App1 | Public1 | Menu 103 | Public0 | Region0 | Menu 101 | $80.00 | $73.00 | -$7.00 | No |
| Resource1 | Bu0 | App1 | Public1 | Menu 103 | Public1 | Region0 | Menu 205 | $80.00 | $76.00 | -$4.00 | No |
| ... | ... | ... | ... | ... | ... | ... | ... | ... | ... | ... | ... |
| 37A | 37B | 37C | 37D | 37E | 37F | 37G | 37H | 37I | 37J | 37K | 37L |

FIG. 8

DEPLOYMENT LOCATION SUMMARY INFORMATION MANAGEMENT TABLE 38

| BU ID | APP ID | COMPUTE RESOURCE QUANTITY | TOTAL STORAGE CAPACITY | CURRENT DEPLOYMENT LOCATION ID | RECOMMENDED DEPLOYMENT LOCATION ID | CURRENT MONTHLY USAGE FEE | POST-MIGRATION MONTHLY USAGE FEE | MONTHLY USAGE FEE DIFFERENCE |
|---|---|---|---|---|---|---|---|---|
| Bu0 | App0 | 30 | 500 GB | Private0 | Public0 | $3010 | $1240 | -$1770 |
| Bu0 | App1 | 10 | 100 GB | Private0 | Private0, Public1 | $570 | $300 | -$270 |
| Bu1 | App2 | 15 | 300 GB | Private1 | Public1 | $1650 | $930 | -$720 |
| ... | ... | ... | ... | ... | ... | ... | ... | ... |
| 38A | 38B | 38C | 38D | 38E | 38F | 38G | 38H | 38I |

FIG. 17

REDUCIBLE COST BREAKDOWN

Application: App0 / BU0
Optimization Target: Private Cloud #0 & Public Cloud #0 & Public Cloud #1

| RESOURCE ID | CURRENT DEPLOYMENT LOCATION ID | CURRENT MENU | POST-MIGRATION DEPLOYMENT LOCATION ID | POST-MIGRATION REGION | POST-MIGRATION MENU ID | CURRENT MONTHLY USAGE FEE | POST-MIGRATION MONTHLY USAGE FEE | MONTHLY USAGE FEE DIFFERENCE |
|---|---|---|---|---|---|---|---|---|
| Resource0 | Private0 | Onpr001 | Private0 | - | Onpr001 | $40.00 | $35.00 | -$5.00 |
| Resource1 | Public1 | Menu103 | Private0 | - | Onpr004 | $80.00 | $56.00 | -$24.00 |
| Resource2 | Public1 | Menu115 | Public0 | Region0 | Menu010 | $80.00 | $73.00 | -$7.00 |
| Resource3 | Public1 | Menu107 | Public1 | Region0 | Menu106 | $80.00 | $76.00 | -$4.00 |

CURRENT COST CALCULATION AND CONFIGURATION OPTIMIZATION PROCESSING

FUTURE COST AND REDUCIBLE COST CALCULATION PROCESSING

FIRST APPLICATION DETAILED SCREEN DISPLAY PROCESSING

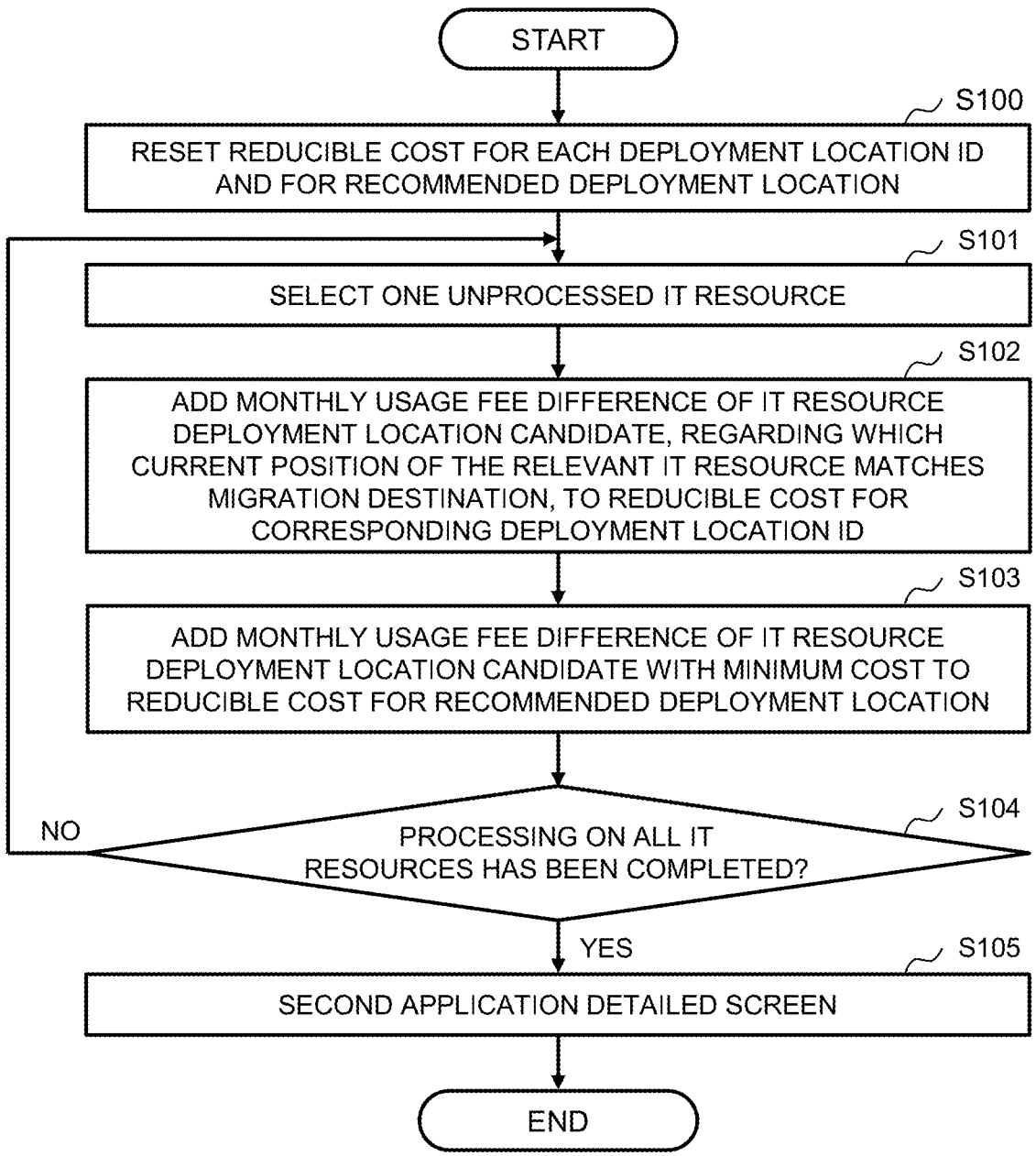

SUPPORT APPARATUS AND METHOD

CROSS-REFERENCE TO RELATED APPLICATION

The present application claims priority from Japanese application JP 2019-184052, filed on Oct. 4, 2019, the contents of which is hereby incorporated by reference into this application.

TECHNICAL FIELD

The present invention relates to a support apparatus and method and is suited for use in, for example, an IT resource deployment optimization support system for supporting work to optimize deployment of information processing resources (hereinafter referred to as "IT [Information Technology] resources") to be allocated to the respective business units such as departments in an organization such as company.

BACKGROUND ART

In recent years, companies which use a plurality of on-premises, private clouds, and public clouds for different usage from the viewpoint of costs and security are increasing; and along with this increase, there is an increasing demand for a tool for managing and optimizing hybrid clouds in an integrated manner.

Particularly, companies which own large-scale IT systems have the demand to be able to: easily judge whether or not IT resources are appropriately allocated to the respective business units; and further optimize the costs of the entire IT system by deploying the IT resources, which are used by the respective business units, in appropriate IT environments such as the on-premises, the private clouds, or the public clouds, respectively.

Regarding such demand, for example, PTL 1 describes that a Quadrant chart with two axes representing a rate of instances having cost effects when executed in a cloud, and a system configuration suited for the cloud (for example, whether encrypted or not and whether updated or not) is used to express judgment materials for judging at which of the cloud or a legacy system each piece of software should be deployed. Then, PTL 1 discloses that an IT system which should be migrated to the cloud can be easily identified by expressing the rate of instances executed in the cloud by using the size of a bubble.

CITATION LIST

Patent Literature

PTL 1: U.S. Unexamined Patent Application Publication No. 2018/0183679

SUMMARY OF THE INVENTION

Problems to be Solved by the Invention

Meanwhile, PTL 1 does not pay consideration to the cost reduction effect by migrating an IT resource(s) to another cloud (or switching to a similar IT resource(s) provided by another cloud), or the importance of business units or applications which use the relevant IT resource(s); and PTL1 has a problem of inability to recognize how many IT resources which can be reduced exist per business unit.

Furthermore, another problem of the invention disclosed in PTL 1 is that no consideration is paid to the existence of some IT resource which should not be migrated instantly merely by seeing the cost reduction effect when the migration target IT resource is important to the company.

The present invention was devised in consideration of the above-described circumstances and aims at solving all the problems of such conventional technology at once and proposing a support apparatus and method capable of facilitating work to optimize deployment locations of the information processing resources.

Means to Solve the Problems

In order to solve the above-described problems, provided according to an aspect of the present invention is a support apparatus for supporting work to optimize deployment of information processing resources respectively allocated to one or more allocation targets, wherein the support apparatus includes: a deployment location candidate calculation unit that calculates a deployment location candidate, which is an appropriate deployment location of each of the information processing resources allocated to each of the allocation targets, and a reducible cost when the information processing resource is allocated to the deployment location candidate, with respect to each information processing resource; and a presentation unit that displays the reducible cost when the deployment of the information processing resource to be allocated to the allocation target is optimized, and importance of the allocation target by associating the reducible cost with the importance of the allocation target with respect to each allocation target on the basis of a result of the calculation by the deployment location candidate calculation unit.

Furthermore, according to another aspect of the present invention, there is provided a support method executed by a support apparatus for supporting work to optimize deployment of information processing resources respectively allocated to one or more allocation targets, wherein the support method includes: a first step of calculating a deployment location candidate, which is an appropriate deployment location of each of the information processing resources allocated to each of the allocation targets, and a reducible cost when the information processing resource is allocated to the deployment location candidate, with respect to each information processing resource; and a second step of displaying the reducible cost when the deployment of the information processing resource allocated to the allocation target is optimized, and importance of the allocation target by associating the reducible cost with the importance of the allocation target with respect to each allocation target on the basis of a result of the calculation of the reducible cost for each information processing resource.

The support apparatus and method according to the aspects of the present invention can make a user easily judge the information processing resources whose deployment locations should be reviewed, and their priorities while considering both the reducible cost and the importance of each allocation target on the basis of the displayed content.

Advantageous Effects of the Invention

The support apparatus and method capable of facilitating work to optimize deployment locations of the information processing resources can be implemented according to the present invention.

BRIEF DESCRIPTION OF DRAWINGS

FIG. 3 is a chart illustrating a structure example of an IT resource configuration information management table;

FIG. 4 is a chart illustrating a structure example of an IT resource performance information management table;

FIG. 5 is a chart illustrating a structure example of an IT resource menu information management table;

FIG. 6 is a chart illustrating a structure example of an on-premises asset information management table;

FIG. 7 is a chart illustrating a structure example of an IT resource deployment location candidate management table;

FIG. 8 is a chart illustrating a structure example of a deployment location summary information management table;

FIG. 17 is a diagram illustrating a structure example of an IT resource breakdown screen;

FIG. 26 is a flowchart illustrating a processing sequence for second application detailed screen display processing.

DESCRIPTION OF EMBODIMENTS

One embodiment of the present invention will be explained below in detail with reference to the drawings.

Figure 1:
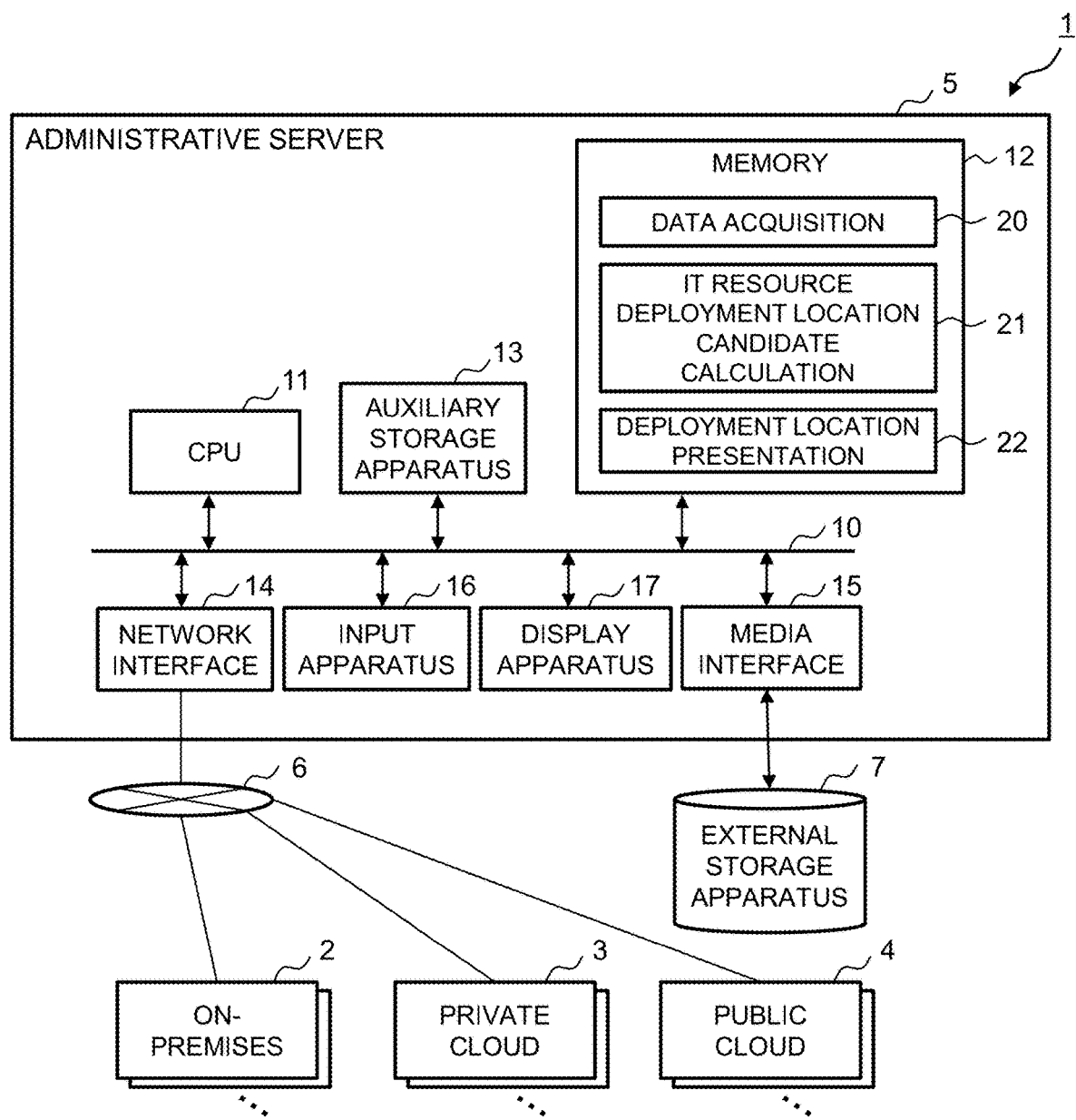
FIG. 1 is a block diagram illustrating an overall configuration of an IT resource deployment optimization support system according to this embodiment.

(1) Configuration of IT Resource Deployment Optimization Support System According to this Embodiment Referring to FIG. 1, 1 represents an IT resource deployment optimization support system according to this embodiment as a whole. This IT resource deployment optimization support system 1 is a system for supporting work to optimize the configuration of IT resources to be allocated to each application used by each business unit of a company/companies or the like which is a target (hereinafter referred to as the "target company/companies") and to optimize the deployment of these IT resources.

Incidentally, the "IT resource(s)" hereinafter indicates: regarding those of a compute class, single items of information processing resources such as a CPU (Central Processing Unit) and a memory, and combinations of such items; regarding those of a storage class, single items of storage resources such as volumes, and combinations of such items; and regarding those of a network class, single items of communication resources such as network bandwidths, and combinations of such items. However, the "IT resource(s)" may sometimes indicate combinations of such information processing resources, storage resources, and/or communication resources.

Moreover, the expression "to optimize the configuration of an IT resource(s)" hereinafter means to change the configuration to the configuration from which an excess portion of the IT resources allocated to an application is reduced. For example, if a memory capacity of 4 [GB] is allocated to a certain application, but the memory capacity which is actually used is less than 3 [GB] at maximum, to change the memory capacity to be allocated to that application to 3 [GB] is called "to optimize the configuration (the memory capacity in this example) of the IT resource(s)."

Furthermore, the expression "to optimize the deployment of an IT resource(s)" hereinafter means to change a deployment location of the IT resource(s) allocated to an application to another more inexpensive deployment location (on-premises, a private cloud, or a public cloud) from the viewpoint of cost. For example, if a current deployment location of an IT resource used by a certain application is on-premises, but it is more inexpensive to switch the deployment location to a public cloud, to change the deployment location of the IT resource so as to allocate that IT resource from the public cloud to the application is to optimize the deployment of the IT resource.

An IT resource deployment optimization support system 1 according to this embodiment is configured by including one or more on-premises 2, one or more private clouds 3, and one or more public clouds 4 which are capable of providing each business unit and each application with the IT resource(s), and an administrative server 5.

The on-premises 2 is an information processing system configured of a server apparatus, a storage apparatus, a network, and so on which provide a on-premises environment constructed by the target company within its own company. Furthermore, the private cloud 3 is an information processing system configured of a server apparatus, a storage apparatus, a network, and so on which provide a private cloud environment constructed by the target company within its own company's data center or the like; and the public cloud 4 is an information processing system configured of a server apparatus, a storage apparatus, a network, and so on which provide a public cloud environment constructed by the target company within its own company's data center or the like.

The administrative server 5 is a computer apparatus equipped with a function that collects necessary information from the on-premises 2, the private cloud 3, and the public cloud 4, judges an optimum configuration and proper deployment locations of IT resources to be used by each business unit of the target company on the basis of the collected information, and presents them to the user (hereinafter referred to as the "IT resource deployment optimization support function").

This administrative server 5 is configured of a general-purpose server apparatus including a CPU (Central Processing Unit) 11, a memory 12, an auxiliary storage apparatus 13, a network interface 14, a media interface 15, an input apparatus 16, and a display apparatus 17 which are coupled to each other via an internal bus 10.

The CPU 11 is a processor which controls operations of the entire administrative server 5. Moreover, the memory 12 is configured of, for example, a volatile semiconductor memory and is used as a work memory for the CPU 11. The memory 12 stores various programs loaded from the auxiliary storage apparatus 13 when the administrative server 5 is activated or whenever necessary. A data acquisition program 20, an IT resource deployment location candidate calculation program 21, and a deployment location presentation program 22, which will be described later, are loaded to, and retained in this memory 12 whenever necessary.

The auxiliary storage apparatus 13 is configured of, for example, a hard disk drive, an SSD (Solid State Drive), or a nonvolatile large-capacity storage apparatus such as a flash memory and is used to retain programs and necessary data for a long period of time.

The network interface 14 is configured of, for example, an NIC (Network Interface Card) and performs protocol control when the administrative server 5 communicates with a server apparatus and so on of the on-premises 2, the private cloud 3, and the public cloud 4 via the network 6. Furthermore, the media interface 15 functions as an interface when the administrative server 5 accesses the external storage apparatus 7.

The input apparatus 16 is configured of a mouse, a keyboard, and so on and is used by a user to perform various operations on the administrative server 5. Moreover, the display apparatus 17 is configured of a liquid crystal display, an organic EL (Electro-Luminescence) display, and so on and is used to display necessary screens and information.

Figure 2:
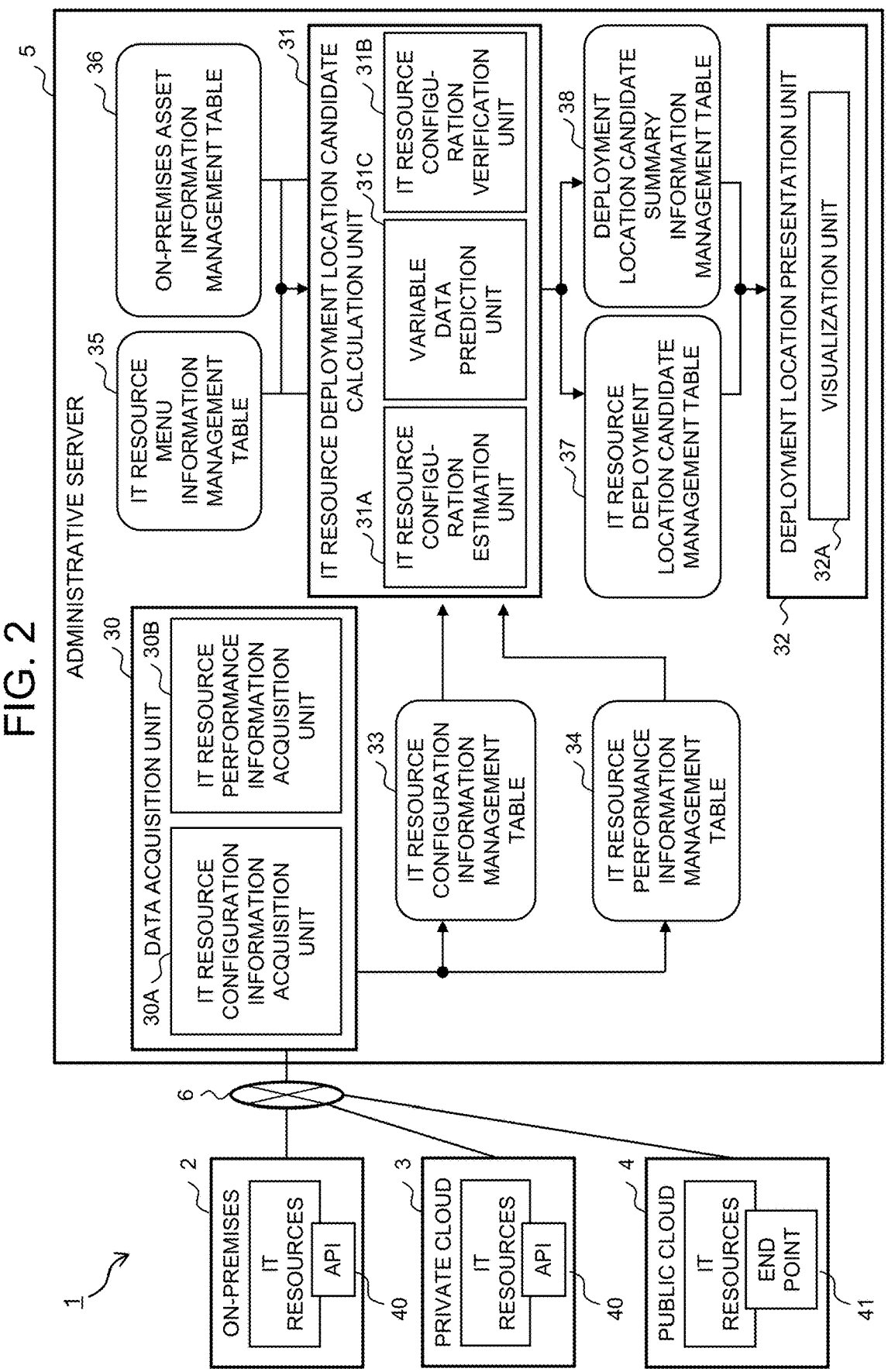
FIG. 2 is a block diagram illustrating a logical configuration of an administrative server.

FIG. 2 illustrates a logical configuration of the administrative server. The administrative server 5 includes, as illustrated in this FIG. 2, a data acquisition unit 30, an IT resource deployment location candidate calculation unit 31, and a deployment location presentation unit 32 as means for implementing the IT resource deployment optimization support function, as well as an IT resource configuration information management table 33, an IT resource performance information management table 34, an IT resource menu information management table 35, an on-premises asset information management table 36, an IT resource deployment location candidate management table 37, and a deployment location summary information management table 38 which are stored in either the auxiliary storage apparatus 13 (FIG. 1) or the external storage apparatus 7 (FIG. 1).

The data acquisition unit 30 is a function unit that is embodied by execution of the data acquisition program 20 (FIG. 1), which is loaded to the memory 12 (FIG. 1), by the CPU 11 (FIG. 1) and is configured of an IT resource configuration information acquisition unit 30A and an IT resource performance information acquisition unit 30B.

The IT resource configuration information acquisition unit 30A is a function unit equipped with a function that acquires configuration information of each IT resource, which is allocated to each application used by each business unit of the target company (hereinafter referred to as the "allocated IT resource"), from each of the corresponding on-premises 2, private cloud 3, and/or public cloud 4. The IT resource configuration information acquisition unit 30A stores each piece of the acquired configuration information of each allocated IT resource in the IT resource configuration information management table 33 and manages such configuration information.

Furthermore, the IT resource performance information acquisition unit 30B is a function unit equipped with a function that acquires performance information of each allocated IT resource from the corresponding on-premises 2, private cloud 3, and/or public cloud 4. The IT resource performance information acquisition unit 30B stores each piece of the acquired performance information of the allocated IT resource in the IT resource performance information management table 34 and manages such performance information.

Incidentally, the IT resource configuration information acquisition unit 30A and the IT resource performance information acquisition unit 30B: acquire the configuration information and the performance information of the respective allocated IT resources of the on-premises 2 and the private cloud 3 by using an API (Application Programming Interface) 40 of the on-premises 2 and the private cloud 3; and acquire the configuration information and the performance information of the allocated IT resources of the public cloud 4 by using an end point 41. Moreover, the IT resource configuration information acquisition unit 30A and the IT resource performance information acquisition unit 30B manage the on-premises 2 and the private cloud 3 by assigning a unique number to each installment location and manage the public cloud 4 by assigning a unique number to each cloud service provider.

The IT resource deployment location candidate calculation unit 31 is a function unit that is embodied by execution of the IT resource deployment location candidate calculation program 21 (FIG. 1), which is loaded to the memory 12, by the CPU 11 and is configured of an IT resource configuration estimation unit 31A, a variable data prediction unit 31B, and an IT resource configuration verification unit 31C.

The variable data prediction unit 31B is a function unit equipped with a prediction function that predicts a data volume which is read/written by the target company from/to the on-premises 2, the private cloud 3, and/or the public cloud 4, and temporal changes of data which changes over time.

Furthermore, the IT resource configuration estimation unit 31A has a function that calculates the current cost required to use each allocated IT resource (hereinafter referred to as the "monthly usage fee") on the basis of information stored in the IT resource configuration information management table 33, the IT resource performance information management table 34, the IT resource menu information management table 35, and the on-premises asset information management table 36, respectively.

Additionally, the IT resource configuration estimation unit 31A also has a function that calculates an optimum configuration, from which an excess portion is reduced from the viewpoint of a current usage status, with respect to each allocated IT resource by using the prediction result by the variable data prediction unit 31B as appropriate. An existing optimization method can be applied as a method for optimizing the configuration of the allocated IT resources. For example, it is possible to use a method similar to a method used for Resource Optimization Recommendations of the Amazon Web Service.

The IT resource configuration verification unit 31C has a function that: calculates a proper deployment location of each allocated IT resource with the optimized configuration as an IT resource deployment location candidate; and calculates a usage cost (hereinafter referred to as the "monthly usage fee") and a reducible cost (hereinafter referred to as the "reducible cost for the monthly usage fee") of each allocated IT resource when each allocated IT resource is migrated to the corresponding IT resource deployment location candidate (when the allocated IT resource is switched to the corresponding IT resource deployment location candidate).

The IT resource configuration verification unit 31C: stores information such as the calculated IT resource deployment location candidate of each allocated IT resource and the usage cost and the reducible cost after migrating the allocated IT resource to its IT resource deployment location candidate in the IT resource deployment location candidate management table 37 and manages such information; and stores summary information, which summarizes the information stored in the IT resource deployment location candidate management table 37, in the deployment location summary information management table 38 and manages such summary information.

The deployment location presentation unit 32: is a function unit that is embodied by execution of the deployment location presentation program 22, which is loaded to the memory 12, by the CPU 11; and is configured by including a visualization unit 32A. The visualization unit 32A generates each of screens described later with reference to FIG. 9 to FIG. 16 on the basis of each piece of the information stored in the IT resource deployment location candidate management table 37 and the deployment location summary information management table 38 and displays such screens on the display apparatus 17 (FIG. 1).

Meanwhile, the IT resource configuration information management table 33 is a table used to manage the configuration information of each allocated IT resource in the on-premises 2, the private cloud 3 and the public cloud 4, which is acquired by the IT resource configuration information acquisition unit 30A for the data acquisition unit 30 as described earlier.

This IT resource configuration information management table 33 is configured, as illustrated in FIG. 3, by including a resource ID column 33A, a business unit ID column 33B, an application ID column 33C, a menu ID column 33D, and a capacity column 33E. One row of the IT resource configuration information management table 33 corresponds to the configuration information of one allocated IT resource which is acquired from the on-premises 2, the private cloud 3, or the public cloud 4 by the IT resource configuration information acquisition unit 30A.

Then, the resource ID column 33A stores a unique identifier (resource ID) of the relevant allocated IT resource, which is assigned to the relevant allocated IT resource. Moreover, the application ID column 33C stores a unique identifier (application ID) of the relevant application, which is assigned to an application that is used by a business unit, to which the relevant business unit ID is assigned, and uses the allocated IT resource to which the relevant resource ID is assigned.

The business unit ID column 33B stores a unique identifier (business unit ID) of the relevant business unit, which is assigned to the business unit which uses the relevant application.

Furthermore, the menu ID column 33D stores an identifier (menu ID) of a menu used by the relevant application of the relevant business unit with respect to the relevant allocated IT resource from among menus which are previously set by the target company with respect to the on-premises 2 and the private cloud 3 of their own company, and menus presented by a public cloud provider. The details of such "menu(s)" will be explained later. Furthermore, the capacity column 33E stores a capacity of a memory or a storage apparatus if the relevant allocated IT resource is the memory or the storage apparatus.

Therefore, in the case of FIG. 3, it is shown that, for example, the application called "App0" which is used by a business unit to which the business unit ID "Bu0" is assigned uses an IT resource called "Resource2" which is provided by a menu called "onpr030" and its capacity is "1.00" [GB].

The IT resource performance information management table 34 is a table used to manage the acquired performance information of each allocated IT resource in the on-premises 2, the private cloud 3, and the public cloud 4, which is acquired by the IT resource performance information acquisition unit 30B for the data acquisition unit 30.

This IT resource performance information management table 34 is configured, as illustrated in FIG. 4, by including; a resource ID column 34A, a past one-month average utilization rate column 34B, a past one-month lowest utilization rate column 34C, and a past one-month highest utilization rate column 34D; a set of pluralities of inbound communication source columns 34E and inbound communication traffic volume columns 34F which form pairs; a set of pluralities of outbound communication destination columns 34G and outbound communication traffic volume columns 34H which form pairs; and an acquisition time column 34I. One row of the IT resource performance information management table 34 corresponds to the performance information of one allocated IT resource acquired from the on-premises 2, the private cloud 3, or the public cloud 4 by the IT resource performance information acquisition unit 30B.

Then, the acquisition time column 34I stores time of day when the information of the relevant row was acquired (acquisition time); and the resource ID column 34A stores the resource ID of the relevant allocated IT resource. Moreover, the past one-month average utilization rate column 34B stores an average utilization rate of the relevant IT resource for the past one month; and the past one-month lowest utilization rate column 34C and the past one-month highest utilization rate column 34D store the lowest utilization rate and the highest utilization rate, respectively, of the allocated IT resource for the past one month.

The inbound communication source column 34E stores the resource ID of an IT resource which is a transmission source of data received by the relevant allocated IT resource for the past one month; and the inbound communication traffic volume column 34F which forms a pair with the relevant inbound communication source column 34E stores a total amount of data transmitted from that IT resource to the allocated IT resource for the past one month.

Furthermore, the outbound communication destination column 34G stores the IT resource ID of an IT resource to which the relevant allocated IT resource transmitted data for the past one month; and the outbound communication traffic volume column 34H which forms a pair with the relevant outbound communication destination column 34G stores a total amount of data transmitted from the allocated IT resource to that IT resource for the past one month.

Therefore, in the case of the example in FIG. 4, for example, it is shown that regarding the ID resource to which the resource ID "Resource0" is assigned according to the information acquired by the IT resource performance information acquisition unit 30B for the data acquisition unit 30 at "2019/4/100:00:00," the average utilization rate for the past one month is "40.5%," the lowest utilization rate for the past one month is "8.1%," and the highest utilization rate for the past one month is "67.5%"; and that IT resource received data in the total amount of "120 GB" from the IT resource "Resource1" for the past one month and transmitted data in the total amount of "85 GB" to that IT resource.

Meanwhile, the IT resource menu information management table 35 is a table used to manage the menu information of the menus of the cloud service provided by each public cloud provider and the menu information of the menus which are previously set regarding each private cloud 3 by the target company.

Incidentally, the term "menu" herein used means an IT resource usage unit which is uniquely decided by the public cloud provider or the target company; and, for example, if the allocated IT resource is a compute resource, a menu is defined such that "○ pieces of CPUs whose CPU clock is ○○ [GHz]; a memory is ○○ [GB]; and a network bandwidth is ○○ [Gbps]."

The IT resource menu information management table 35 is configured, as illustrated in FIG. 5, by including a menu ID column 35A, a resource class column 35B, a cloud ID column 35C, a region ID column 35D, a service class column 35E, a service type column 35F, a unit price column 35G, a quantity-of-CPUs column 35H, a CPU clock column 35I, a memory size column 35J, a resource storage type column 35K, a volume size column 35L, a network bandwidth column 35M, a maximum IOPS column 35N, a designated volume unit column 35O, a maximum volume size column 35P, an inbound unit price column 35Q, and an outbound unit price column 35R. One row of the IT resource menu information management table 35 corresponds to one menu which is provided by any one of public cloud providers or which is uniquely decided for the private cloud 3 by the target company.

Then, the menu ID column 35A stores a unique identifier (menu ID) of the relevant menu, which is assigned to the relevant menu by the administrative server 5; and the resource class column 35B stores a resource class (compute, storage, or network) of a target IT resource in the relevant menu.

Moreover, the cloud ID column 35C stores a unique identifier (cloud ID) of the relevant public cloud 4 or private cloud 3, which is assigned to the public cloud 4 or the private cloud 3 that provides the relevant menu; and the region ID column 35D stores a unique identifier (region ID) of the relevant region, which is assigned to the region where a data center of the public cloud 4 or the private cloud 3 is installed.

Furthermore, the service class column 35E stores a service class of the relevant menu. Regarding the service class, for example, when the resource class of the relevant menu is a compute ("Compute"), there are on-demand ("On-Demand") and reserved ("Reserved"); when the resource class is a storage ("Storage"), a block storage apparatus ("Block"), an object storage apparatus, or the like can be selected as a storage apparatus; and when the resource class is a network ("Network"), there are, for example, the use of an Internet gateway ("Internet Gateway") and a VPN (Virtual Private Network) connection.

The service type column 35F stores code information indicating a service type of the relevant menu. Moreover, the unit price column 35G stores a unit price of the relevant menu. Regarding the unit price, for example, when the resource class of the relevant menu is the compute ("Compute"), a usage fee of the provided IT resource per unit time is stored; when the resource class is the storage ("Storage"), a fee of the provided volume per unit capacity is stored; and when the resource class is the network ("Network"), a fee of the provided network per unit communication traffic volume is stored.

Each of the quantity-of-CPUs column 35H, the CPU clock column 35I, the memory size column 35J, the resource storage type column 35K, the volume size column 35L, and the network bandwidth column 35M is used when the resource type of the relevant menu is the compute ("Compute").

Then, the quantity-of-CPUs column 35H stores the quantity of CPUs provided by the relevant menu; the CPU clock column 35I stores the clock number of such CPUs; and the memory size column 35J stores a memory capacity of a memory provided by that menu.

Moreover, the resource storage type column 35K stores a storage type provided by the relevant menu (such as a hard disk, SSD, or flash memory); and the volume size column 35L stores a storage capacity provided by the relevant menu. Furthermore, the network bandwidth column 35M stores a network bandwidth provided by the relevant menu.

Meanwhile, each of the maximum IOPS column 35N, the designated volume unit column 35O, and the maximum volume size column 35P is used when the resource type of the relevant menu is the storage ("Storage").

Then, the maximum IOPS column 35N stores the maximum data I/O count which can be processed per unit time (IOPS: Input/Output operations Per Second) with respect to a volume provided by the relevant menu. Moreover, the designated volume unit column 35O stores a unit (for example, 1 [GB]) when setting a volume capacity in the relevant menu; and the maximum volume size column 35P stores the maximum capacity of a volume which can be provided by the relevant menu.

On the other hand, both the inbound unit price column 35Q and the outbound unit price column 35R are used when the resource type of the relevant menu is the network ("Network").

Then, the inbound unit price column 35Q stores a fee per unit data volume (inbound unit price) when inputting data via the network provided by the relevant menu; and the outbound unit price column 35R stores a fee per unit data volume (outbound unit price) when outputting data via that network.

Therefore, in the case of the example in FIG. 5, it is shown that, for example, the menu to which the menu ID "Menu000" is assigned is a menu for a service of the service type "C-0-2" by which the public cloud 4 called "Public0" whose data center is installed in the region "Region0" provides the IT resource of the resource class "compute (Compute)" by "On-Demand" and the unit price per unit time is "0.016." Also, FIG. 5 shows that this menu is a set of "2" pieces of CPUs whose CPU clock is "2.3" [GB], a memory of "4" [GB], and a network bandwidth of "10" [Gbps].

Incidentally, the IT resource menu information management table 35 may be created by the target company in advance or may be created by the administrative server 5 by acquiring the menu information from each public cloud provider and creating part of it. Moreover, the administrative server 5 may update the IT resource menu information management table as appropriate by regularly or irregularly acquiring the menu information from the public cloud provider or the server apparatus or the like of the target company.

The on-premises asset information management table 36 is a table used to manage the menu information of menus which are previously set for on-premises assets by the target company. This on-premises asset information management table 36 is configured, as illustrated in FIG. 6, by including a menu ID column 36A, a resource class column 36B, an on-premises ID column 36C, an asset purchase price column 36D, an asset purchase month column 36E, an asset's durable years column 36F, an asset's maximum electric power consumption column 36G, a quantity-of-CPUs column 36H, a CPU clock count column 36I, a memory size column 36J, a resource storage type column 36K, a volume size column 36L, a maximum IOPS column 36M, a designated volume unit column 36N, a maximum volume size column 36O, and a unit price column 36P. One row of the on-premises asset information management table 36 corresponds to one menu which is previously set for the on-premises 2 by the target company.

Then, the menu ID column 36A stores a menu ID assigned to the relevant menu by the administrative server 5; and the resource class column 36B stores a resource class of an IT resource provided by the relevant menu. Incidentally, no cost occurs for the use of the network itself in the case of the on-premises 2, so that the resource classes in this case are only the compute ("Compute") and the storage ("Storage").

Moreover, the on-premises ID column 36C stores a unique identifier (on-premises ID) of on-premises, which is assigned to the on-premises 2 provided by the relevant menu. Furthermore, the asset purchase price column 36D, the asset purchase month column 36E, the asset's durable years column 36F, and the asset's maximum electric power consumption column 36G store a purchase price of an IT apparatus (a compute apparatus or a storage apparatus) which provides the IT resource of the relevant menu, a purchase month, and the asset's durable years, and the maximum electric power consumption, respectively.

Furthermore, the quantity-of-CPUs column 36H, the CPU clock column 36I, the memory size column 36J, the resource storage type column 36K, the volume size column 36L, the maximum IOPS column 36M, the designated volume unit column 36N, and the maximum volume size column 36O respectively store information of the same kinds as those of the corresponding columns among the quantity-of-CPUs column 35H, the CPU clock column 35I, the memory size column 35J, the resource storage type column 35K, the volume size column 35L, the maximum IOPS column 35N, the designated volume unit column 35O, and the maximum volume size column 35P of the IT resource menu information management table 35 described earlier with reference to FIG. 5.

Furthermore, the unit price column 36P stores a cost per unit time (unit price) required to use the IT resource provided by the relevant menu. This unit price is calculated as a total price of an asset value of the IT resource provided by the menu at that point in time and a cost per unit time required to operate that IT resource (operating cost). Incidentally, the term "unit time" used herein is identical to the unit time in the case where the resource class of the relevant menu in the unit price column 35G (FIG. 5) of the IT resource menu information management table 35 (FIG. 5) is the compute.

Therefore, in the case of the example in FIG. 6, it is shown that, for example, the menu to which the menu ID "Onpr000" is assigned is: a menu which is provided by the on-premises 2 with the on-premises ID "Private0" and which is targeted at the IT resource whose resource class is the "compute (Compute)"; and specifically, a menu which provides one IT resource composed of a set of "16" pieces of CPUs whose CPU clock is "2.3" [GB] and a memory of "4" [GB]. Moreover, FIG. 6 shows that the purchase price of the IT apparatus which provides the IT resource of that menu is "20" [M$], the purchase month is "201606," the durable years are "60" years, the maximum electric power consumption is "900" [KW], and its unit price is "0.23" [$].

The IT resource deployment location candidate management table 37 is a table used to store and retain the IT resource deployment location candidate of each allocated IT resource which is calculated by the IT resource configuration verification unit 31C (FIG. 2) for the IT resource deployment location candidate calculation unit 31 (FIG. 2) as described earlier.

This IT resource deployment location candidate management table 37 is configured, as illustrated in FIG. 7, by including a resource ID column 37A, a business unit ID column 37B, an application ID column 37C, a current deployment location ID column 37D, a current menu ID column 37E, a post-migration deployment location ID column 37F, a post-migration region ID column 37G, a post-migration menu ID column 37H, a current monthly usage fee column 37I, a post-migration monthly usage fee column 37J, a monthly usage fee difference column 37K, and a minimum cost column 37L. One row of the IT resource deployment location candidate management table 37 corresponds to one IT resource deployment location candidate calculated for one allocated IT resource.

Then, the resource ID column 37A stores a resource ID of an allocated IT resource which is optimized, and whose proper deployment location is calculated, by the IT resource configuration verification unit 31C; and the application ID column 37C stores an application ID of an application which uses that allocated IT resource. Moreover, the business unit ID column 37B stores a business unit ID of a business unit which uses that application.

Furthermore, the current deployment location ID column 37D stores an identifier (an on-premises ID or a cloud ID) of a current deployment location (the on-premises 2, the private cloud 3, or the public cloud 4) of the relevant allocated IT resource; and the current menu column 37E stores a menu ID of a menu which provides the relevant allocated IT resource.

The post-migration deployment location ID column 37F stores an identifier (an on-premises ID or a cloud ID) of a proper migration destination (the on-premises 2, the private cloud 3, or the public cloud 4) of the relevant allocated IT resource which is calculated by the IT resource configuration verification unit 31C; and the post-migration region ID column 37G stores a region ID of a region where the on-premises 2 calculated as the proper deployment location of the relevant allocated IT resource is installed, or a region where a data center of the private cloud 3 or the public cloud 4 is installed. Moreover, the post-migration menu ID column 37H stores a menu ID of a menu applied to use the relevant allocated IT after migrating the relevant allocated IT resource to such proper deployment location.

Furthermore, the current monthly usage fee column 37I stores a current monthly usage fee of the relevant allocated IT resource; and the post-migration monthly usage fee column 37J stores a monthly usage fee of the relevant allocated IT resource when the relevant allocated IT resource calculated by the IT resource configuration verification unit 31C is migrated to the relevant deployment location, that is, the on-premises 2, the private cloud 3, or the public cloud 4.

Furthermore, the monthly usage fee difference column 37K stores the difference amount between the current monthly usage fee of the relevant allocated IT resource stored in the current monthly usage fee column 37I and the monthly usage fee, which is stored in the post-migration monthly usage fee column 37J, after the migration to the on-premises 2, the private cloud 3, or the public cloud 4 which is the proper migration destination.

Furthermore, the minimum cost column 37L stores: regarding an IT resource deployment location candidate with the lowest cost (monthly usage fee) among IT resource deployment location candidates with respect to the same application used by the same business unit, information to that effect ("Yes" in FIG. 7); and regarding the IT resource deployment location candidates other than the above-described IT resource deployment location candidate, information to that effect ("No" in FIG. 7).

Therefore, in the case of the example in FIG. 7, it is shown that, for example, regarding an allocated IT resource "Resource0" used by an application "App0" of a business unit "Bu0," a menu "Menu001" provided by the private cloud 3 "Private0" is currently used and its monthly usage fee is "$40.00"; however, by migrating this to an IT resource provided by a menu "Menu102" of the public cloud 4 "Public0" for which a data center is installed in "Region0," the monthly usage fee can be changed to "$28.00" and the difference from the pre-migration monthly usage fee is "$12.00" (the cost reduction of "$12.00" can be implemented). Moreover, FIG. 7 shows that this IT resource deployment location candidate has the lowest cost (a value in the minimum cost column is "Yes") among IT resource deployment location candidates for the same application "App0."

The deployment location summary information management table 38 is a table used to manage the summary information about data deployment location candidates calculated for each allocated IT resource by the IT resource configuration verification unit 31C as described earlier.

This deployment location summary information management table 38 is configured, as illustrated in FIG. 8, by including a business unit ID column 38A, an application ID column 38B, a compute resource quantity column 38C, a total storage capacity column 38D, a current deployment location ID column 38E, a recommended deployment location ID column 38F, a current monthly usage fee column 38G, a post-migration monthly usage fee column 38H, and a monthly usage fee difference column 38I. One row of the deployment location summary information management table 38 corresponds to one allocated IT resource used by one application utilized by one business unit.

Then, the business unit ID column 38A stores a business unit ID of one business unit; and the application ID column 38B stores an application ID of one application used by the relevant business unit.

Moreover, the compute resource quantity column 38C stores the quantity of IT resources of the compute class which are allocated to the relevant application; and the total storage capacity column 38D stores a total capacity of the IT resources (volumes) of the storage class which are allocated to that application.

Furthermore, the current deployment location ID column 38E stores an identifier (an on-premises ID or a cloud ID) of the on-premises 2, the private cloud 3, or the public cloud 4 where the relevant allocated IT resource is currently deployed; and the recommended deployment location ID column 38F stores an identifier (an on-premises ID or a cloud ID) of the on-premises 2, the private cloud 3, or the public cloud 4 which is recommended as a deployment location of that allocated IT resource. Incidentally, when the deployment of the relevant IT resource by dividing it into a plurality of on-premises and clouds is calculated by the IT resource configuration verification unit 31C, identifiers (on-premises IDs and cloud IDs) all on-premises 2, private clouds 3 and/or public clouds 4 which are recommended as deployment locations are stored in the recommended deployment location ID column 38F.

Moreover, the current monthly usage fee column 38G stores a current monthly usage fee of the relevant allocated IT resource which is allocated to the relevant application of the relevant business unit; and the post-migration monthly usage fee column 38H stores a monthly usage fee of the relevant allocated IT resource when that allocated IT resource is migrated to the recommended deployment location.

Furthermore, the monthly usage fee difference column 38I stores the difference amount (reducible cost) between the current monthly usage fee of the relevant allocated IT resource which is stored in the current monthly usage fee column 38G, and the post-migration monthly usage fee stored in the post-migration monthly usage fee column 38H.

Therefore, in the case of the example in FIG. 8, it is shown that, for example, "30" pieces of IT resources of the compute class and "500 GB" IT resources of the storage class are allocated to the application "App0" used by the business unit ID "Bu0"; and these IT resources are currently deployed in the private cloud 3 with the cloud ID "Private0," but it is recommended to migrate them to the public cloud 4 with the cloud ID "Public0." Moreover, FIG. 8 shows that while the current monthly usage fee of the private cloud 3 used by such application is "$3010," the monthly usage fee can be reduced to "$1240" by migrating the IT resources to the recommended deployment location and the reducible cost of "$1770" is estimated.

(2) Structures of Display Screens

Figure 9:
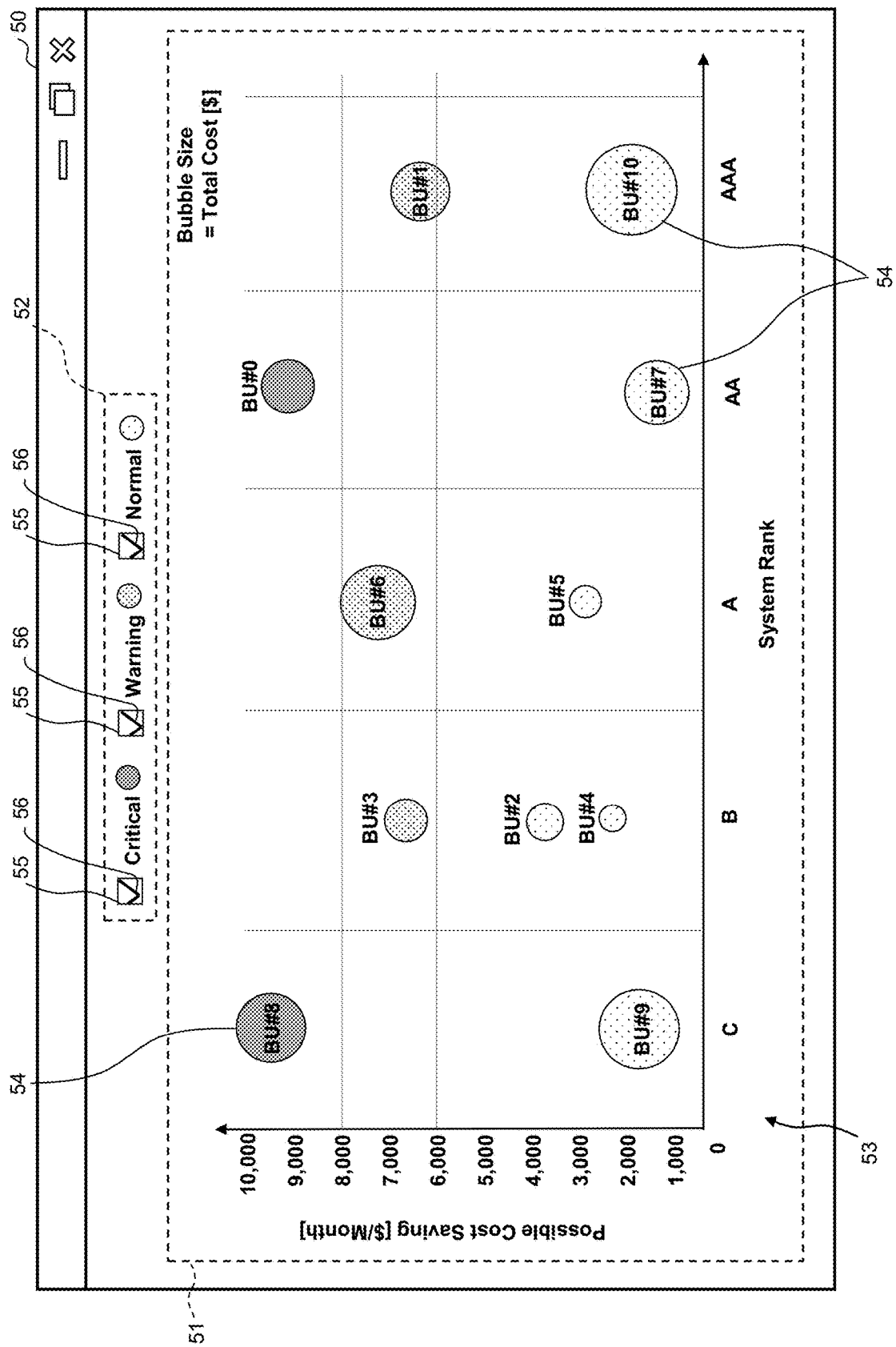
FIG. 9 is a diagram illustrating a structure example of a first IT resource deployment optimization support screen.

FIG. 9 illustrates a screen structure example of a first IT resource deployment optimization support screen 50 displayed on the display apparatus 17 (FIG. 1) by the visualization unit 32A (FIG. 2) for the deployment location presentation unit 32 (FIG. 2). This first IT resource deployment optimization support screen 50 is a screen on which the reducible cost of each business unit and the importance of that business unit are associated with each other and are mapped on plane coordinates 53 when the configuration of each allocated IT resource is optimized and its deployment is further optimized.

Incidentally, in the case of this embodiment, system ranks are used as the "importance of business units." The system ranks are the index for indicating the importance of the system which is automatically assigned in accordance with the results of evaluation of risks of the system (hereinafter referred to as the "application") according to a specified check list. A company assigns points to each of the results of evaluation items and evaluates the IT resources used by the system and rates them as, for example, "AAA," "AA," "A," "B," or "C" within each range to which total points belong.

In this embodiment, regarding the "system rank of a business unit," the highest system rank among the system ranks of each application used by that business unit will be applied. However, the system rank which occupies the largest proportion among the system ranks of each application used by that business unit may be decided as the system rank of that business unit or the system rank of each business unit may be decided by any methods other than the above.

The first IT resource deployment optimization support screen 50 is configured by including a bubble display area 51 and a display condition setting area 52. Then, the bubble display area 51 displays the plane coordinates 53 with its vertical axis representing the reducible cost and its horizontal axis representing the importance of business units.

Moreover, the plane coordinates 53 display circular shaped objects (hereinafter referred to as "first bubbles") 54 corresponding to the respective business units of the target company. Practically, these first bubbles 54 are displayed at their respective coordinate positions by setting the reducible cost in the relevant entire business unit as a coordinate in the vertical axis direction and setting a lateral position according to the system rank of the relevant business unit as a coordinate in the horizontal axis direction when the configuration of each allocated IT resource allocated to each application used by the relevant business unit is optimized and the deployment of each such specified resource is further optimized.

Moreover, each first bubble 54 is displayed with the size according to the current total cost required to use each IT resource allocated to each application used by the relevant business unit; and the business ID of the relevant business unit is indicated inside each first bubble 54.

Furthermore, each first bubble 54 is colored and displayed with the color according to classification of the reducible cost of the relevant business unit. Specifically, in the case of this embodiment, the reducible cost is divided into three divisions: "Critical" with the largest reducible cost; "Warning" with the second largest reducible cost; and "Normal" with the reducible cost smaller than the reducible cost for "Warning." Each first bubble 54 on the plane coordinates 53 is color-coded and displayed with the color according to the relevant division of the reducible cost of each relevant business unit. Incidentally, a threshold value for the classification of the reducible cost may be a fixed value or may be decided according to proportions based on the maximum value of the reducible cost.

Moreover, the display condition setting area 52 displays check boxes 55 which correspond to the respective divisions of the reducible cost. Then, a check mark 56 is displayed within each check box 55 in its initial state.

Figure 10:
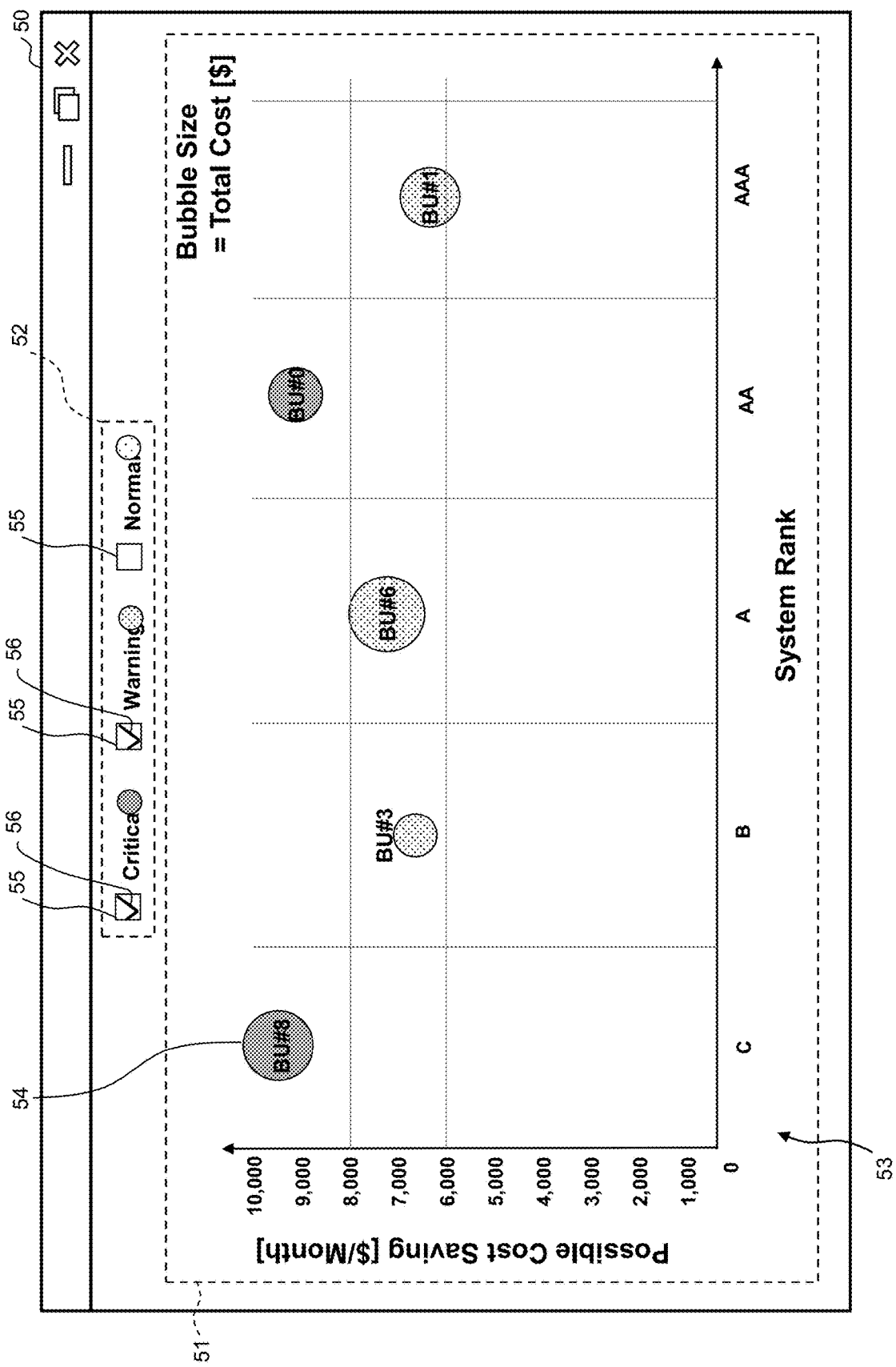
FIG. 10 is a diagram for explaining the first IT resource deployment optimization support screen.

Then, with the first IT resource deployment optimization support screen 50, the first bubble(s) 54 associated with a business unit(s) belonging to a desired division of the reducible cost can be deleted from the plane coordinates 53 in the bubble display area 51 as illustrated in FIG. 10 by clicking and canceling the check mark 56 displayed within the relevant check box 55 for the desired division of the reducible cost among these check marks.

Figure 11:
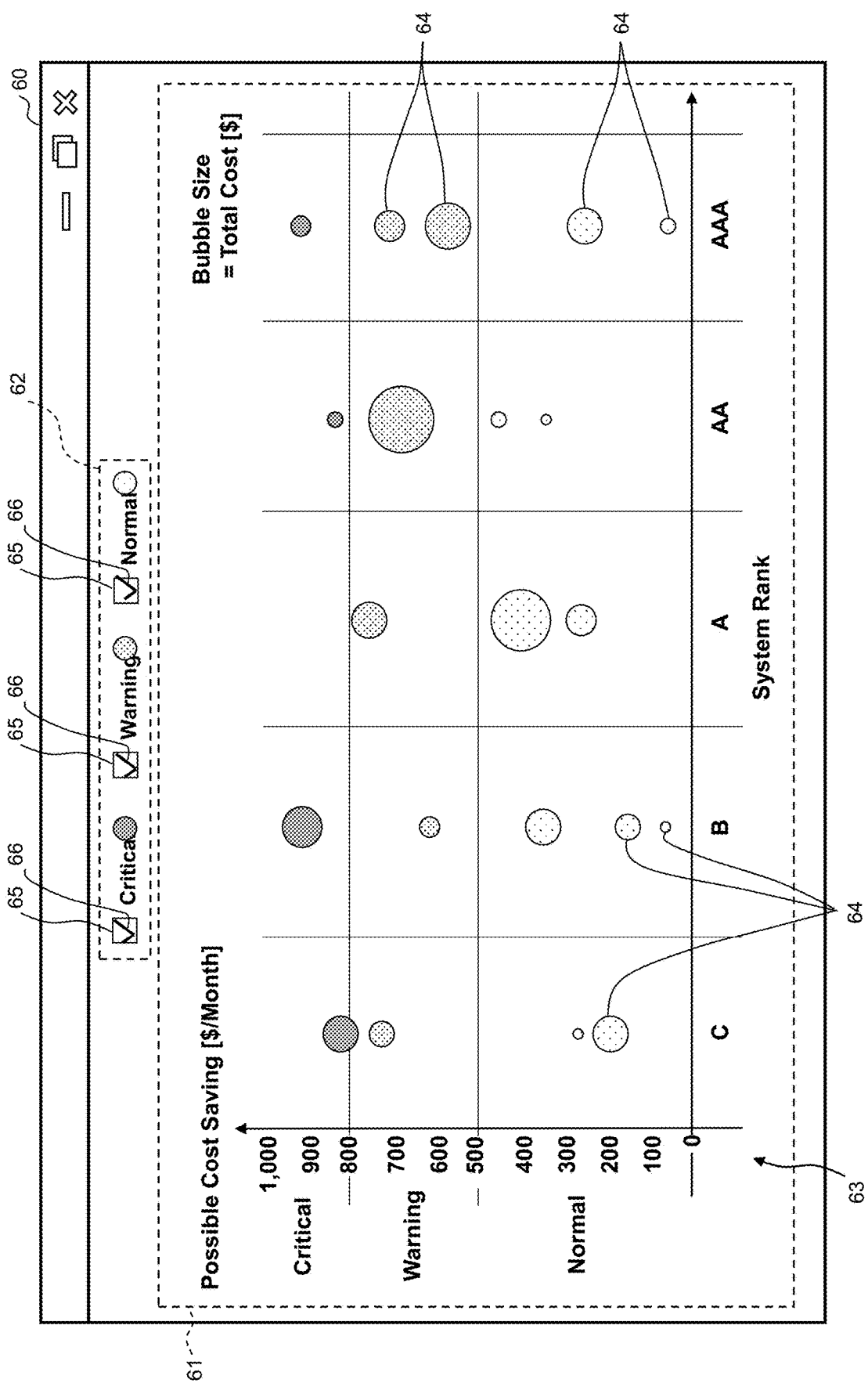
FIG. 11 is a diagram illustrating a structure example of a second IT resource deployment optimization support screen.

On the other hand, it is possible to switch to a second IT resource deployment optimization support screen 60 as illustrated in FIG. 11 by clicking any one of the first bubbles 54 displayed on the plane coordinates 53 in the bubble display area 51 of the first IT resource deployment optimization support screen 50.

This second IT resource deployment optimization support screen 60 is configured by including a bubble display area 61 and a display condition setting area 62 having the configuration similar to that of the bubble display area 51 and the display condition setting area 52 of the first IT resource deployment optimization support screen 50.

Then, circular-shaped objects (hereinafter referred to as "second bubbles") 64, each of which is associated with each application used by the business unit associated with the first bubble 54 clicked on the first IT resource deployment optimization support screen 50 immediately before being switched to the second IT resource deployment optimization support screen 60, are displayed on plane coordinates 63 in the bubble display area 61.

In this case, each second bubble 64 is colored with the color according to the division of the reducible cost of the relevant business unit and displayed at a coordinate position where the reducible cost when the deployment of the allocated IT resource allocated to the relevant application is optimized is set as a coordinate in the vertical axis direction and a lateral position according to the system rank which is decided for the relevant application in advance is set as a coordinate in the horizontal axis direction. Moreover, each second bubble 64 is displayed with the size according to the current cost required to use the allocated IT resource allocated to the relevant application. Incidentally, the application ID of the relevant application may be displayed within each second bubble 64 although it is not displayed in FIG. 11.

Furthermore, with the second IT resource deployment optimization support screen 60, the second bubble 64 associated with each application belonging to a desired division can be deleted from the plane coordinates 63 in the bubble display area 61 by clicking and canceling the check mark 66 of the desired division among the check marks 66 in the respective check boxes 65 associated with the respective divisions of the reducible cost and displayed in the display condition setting area 62 in the same manner as with the first IT resource deployment optimization support screen 50.

Figure 12:
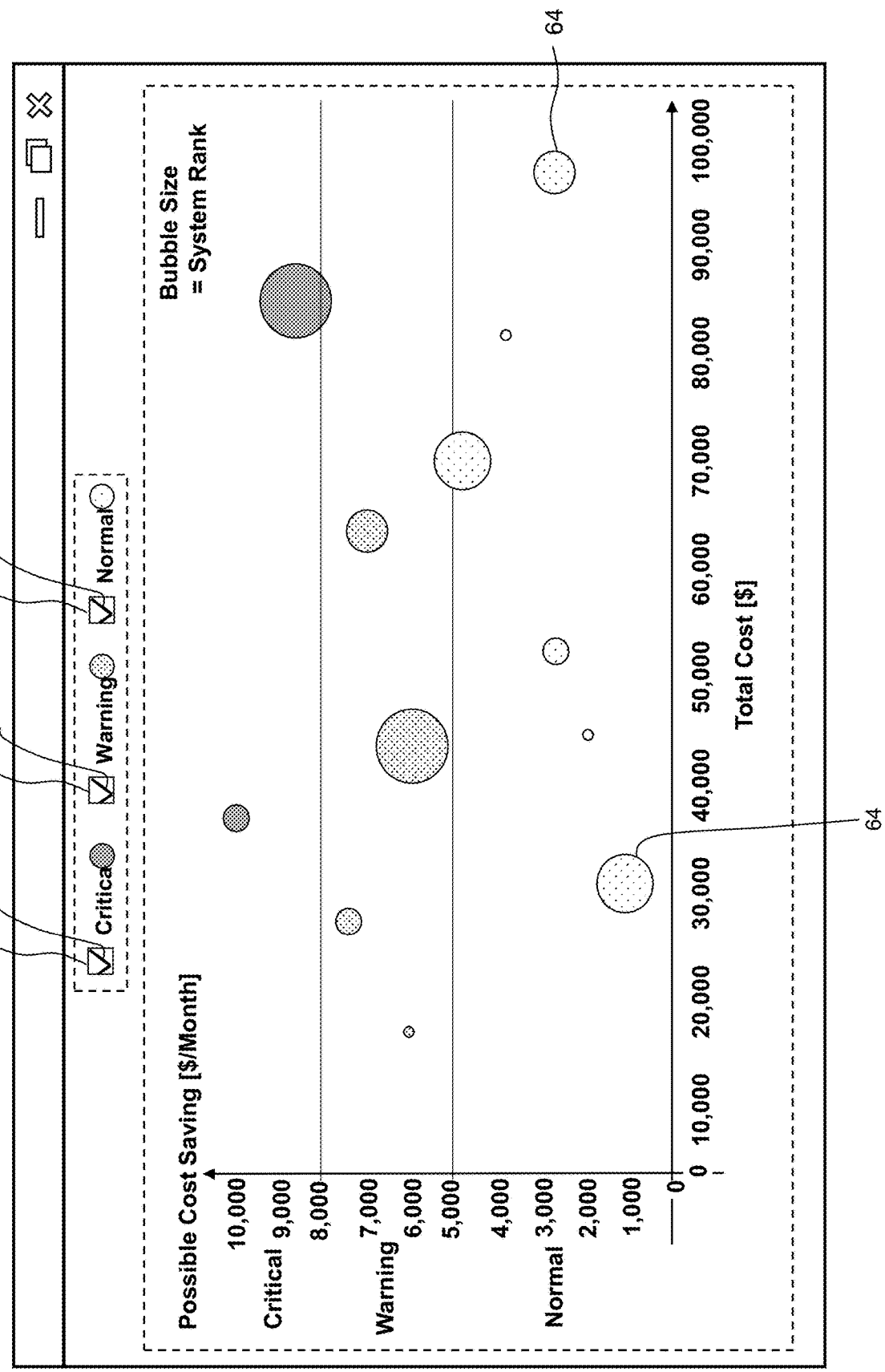
FIG. 12 is a diagram illustrating another display example of the second IT resource deployment optimization support screen.

Incidentally, regarding the second IT resource deployment optimization support screen 60, for example, as illustrated in FIG. 12 where the same reference numerals as those used in FIG. 11 are assigned to the corresponding parts, the horizontal axis of the plane coordinates 63 and the size of the second bubble 64 may be switched between each other, so that the horizontal axis of the plane coordinates 63 may represent a total cost of the allocated IT resources after configuration optimization and deployment optimization and the size of the second bubble 64 may be the size according to the system rank of the relevant business unit or the relevant application. The same applies to the first IT resource deployment optimization support screen 50. In the case of such display mode, an allocated IT resource used by a business unit or an application with the relevant first or second bubble 54, 64 whose size is small is an allocated IT resource which should be prioritized and migrated to another on-premises 2, private cloud 3, or public cloud 4.

Figure 13:
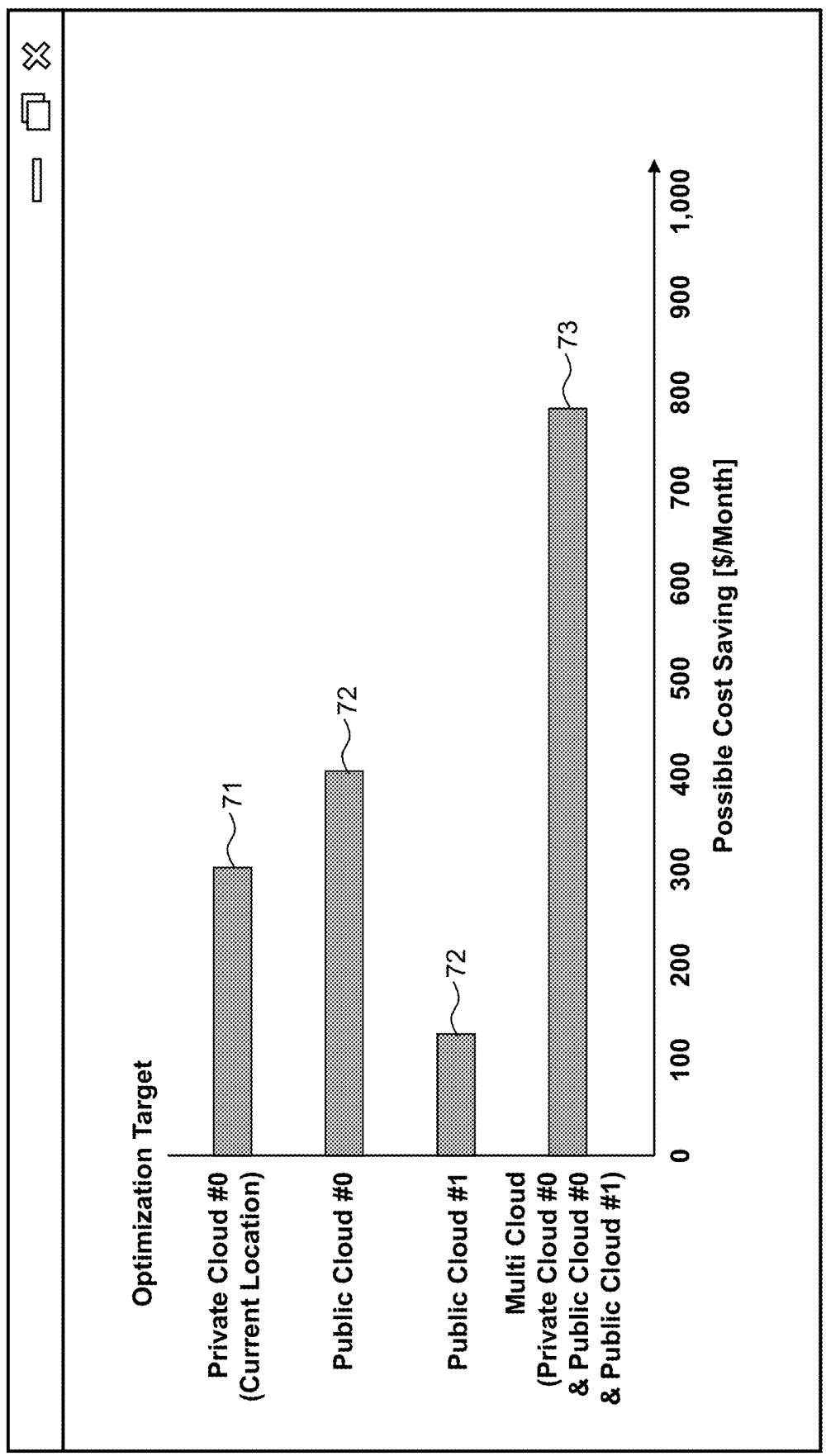
FIG. 13 is a diagram illustrating a structure example of a first application detailed screen.
Figure 14:
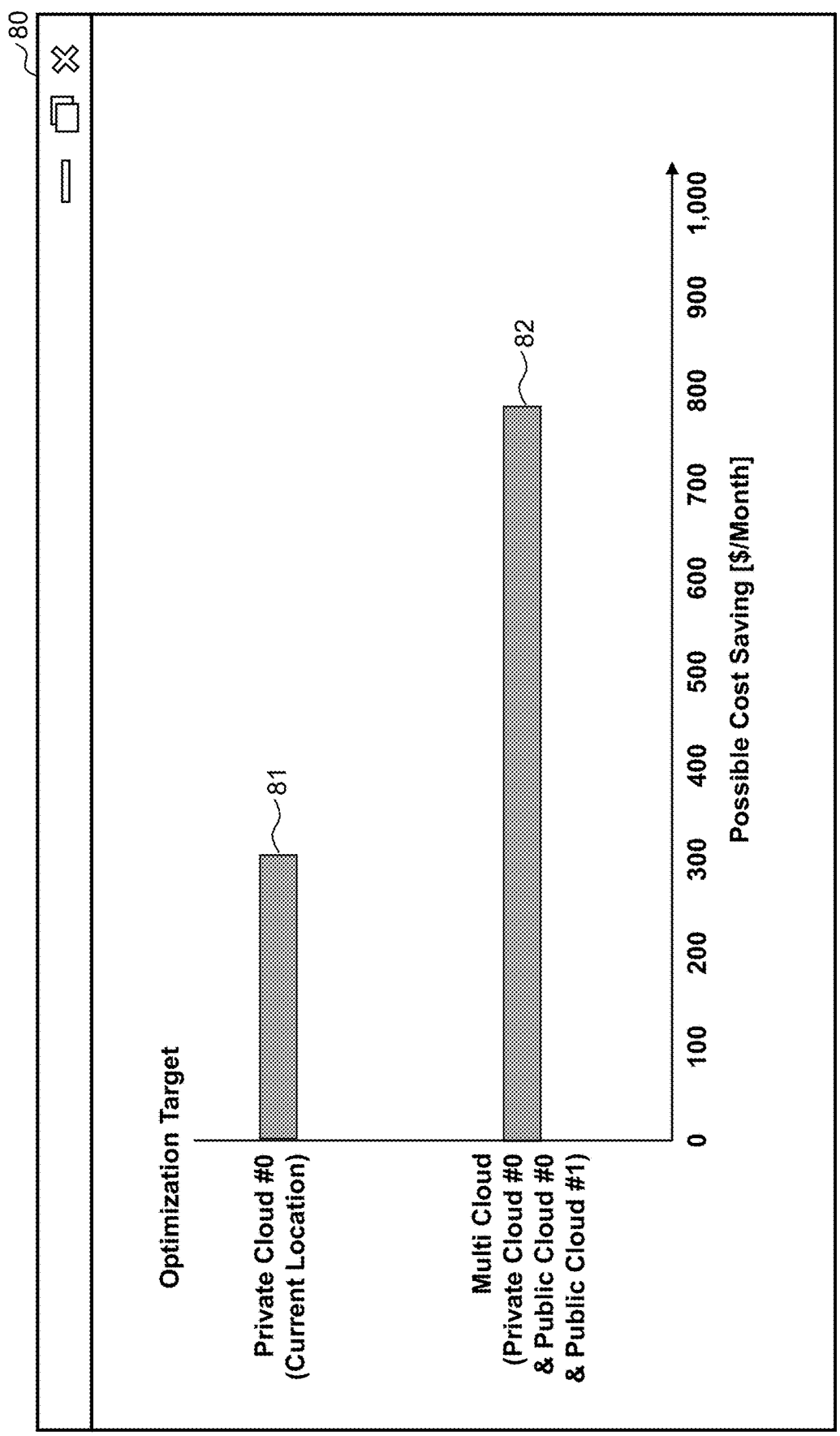
FIG. 14 is a diagram illustrating a structure example of a second application detailed screen.

On the other hand, in this embodiment, a first application detailed screen 70 as illustrated in FIG. 13 or a second application detailed screen 80 as illustrated in FIG. 14 can be overlaid and displayed on the second IT resource deployment optimization support screen 60 by clicking any one of the second bubbles 64 displayed on the plane coordinates 63 in the bubble display area 61 on the second IT resource deployment optimization support screen 60.

Under this circumstance, the first application detailed screen 70 is a screen for presenting the reducible cost when the respective allocated IT resources which are allocated to an application designated by clicking the relevant second bubble 64 on the second IT resource deployment optimization support screen 60 (hereinafter referred to as the "designated application") are collectively deployed in any one of the on-premises 2, the private cloud 3, and the public cloud 4.

Practically, first to third bar graphs 71, 72, 73 are displayed on the first application detailed screen 70. The first bar graph 71 of these bar graphs: is a graph corresponding to the reducible cost when each allocated IT resource used by the designated application is optimized at its current deployment location; and is displayed with the length according to this reducible cost. Incidentally, FIG. 13 shows that the current deployment location of each allocated IT resource used by the designated application is the private cloud 3 to which the cloud ID "Private Cloud #0" is assigned.

Moreover, the second bar graph 72: is a graph corresponding to the reducible cost when these allocated IT resources are integrated and deployed in any one of the on-premises 2, the private cloud 3, and the public cloud 4; and is displayed with the length according to this reducible cost. FIG. 13 shows that such allocated IT resources can be integrated in the public cloud with the cloud ID "Public Cloud #0" or the public cloud 4 with the cloud ID "Public Cloud #1."

Furthermore, the third bar graph 72: is a graph corresponding to the total reducible cost when such each allocated IT resource is deployed in the on-premises 2, the private cloud 3, or the public cloud 4 with the largest reducible cost for each allocated IT resource; and is displayed with the length according to this reducible cost. FIG. 13 shows that the reducible cost becomes the largest when such each allocated IT resource is divided into "Private Cloud #0," "Public Cloud #0," and "Public Cloud #1" and deployed there respectively.

On the other hand, the second application detailed screen 80 is a screen for presenting the reducible cost when only the optimization of the respective allocated IT resources allocated to the designated application is conducted at their current deployment locations and such allocated IT resource are not migrated to another on-premises 2, private cloud 3, or public cloud 4.

Fourth and fifth bar graphs 81, 82 are displayed on this second application detailed screen 80. The fourth bar graph 81 of these bar graphs: is a graph corresponding to the reducible cost when each allocated IT resource allocated to the designated application is optimized at the current deployment location in the same manner as the first bar graph 71 of the first application detailed screen 70; and is displayed with the length according to this reducible cost.

Moreover, the fifth bar graph 82: is a graph corresponding to the total reducible cost when each allocated IT resource allocated to the designated application is deployed in the on-premises 2, the private cloud 3, or the public cloud 4 with the largest reducible cost for each allocated IT resource in the same manner as the third bar graph 73 of the first application detailed screen 70; and is displayed with the length according to this reducible cost.

Figure 15:
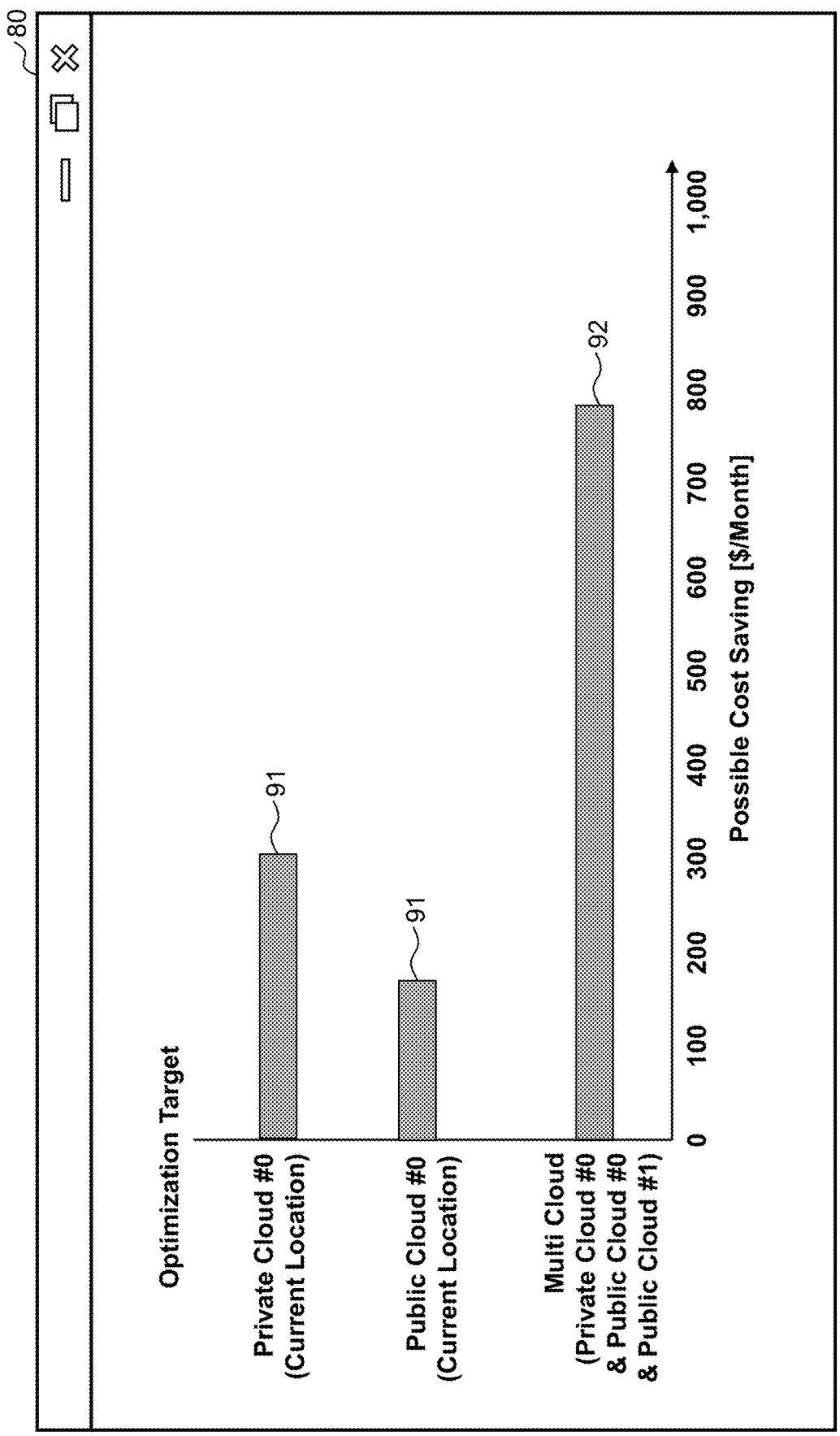
FIG. 15 is a diagram illustrating another display example of the second application detailed screen.

Incidentally, FIG. 15 illustrates a display mode of a second application detailed screen 90 when each allocated IT resource allocated to the designated application extends across a plurality of on-premises 2, private clouds 3, and/or public clouds 4. This second application detailed screen 90 also presents the reducible cost when only the optimization of the respective allocated IT resources is conducted at their current deployment locations and such allocated IT resources are not migrated to another on-premises 2, private cloud 3, or public cloud 4.

Sixth and seventh bar graph 91, 92 are displayed on this second application detailed screen 90. The sixth bar graph 91 of these bar graphs: is a graph corresponding to the reducible cost when only the optimization of the respective allocated IT resources allocated to the designated application is conducted at their current deployment locations and these allocated IT resources are not migrated to another on-premises 2, private cloud 3, or public cloud 4; and is displayed with the length according to this reducible cost.

FIG. 15 shows an example where such allocated IT resources are deployed across the private cloud 3 with the cloud ID "Private Cloud #0" and the public cloud 4 with the cloud ID "Public Cloud #0"; and the reducible cost in the case where only the allocated IT resources deployed in the private cloud 3 with the cloud ID "Private Cloud #0" are optimized is displayed as the sixth bar graph 91 in an upper part and the reducible cost in the case where only the allocated IT resources deployed in the public cloud 4 with the cloud ID "Public Cloud #0" are optimized is displayed as the sixth bar graph 91 in a lower part.

Moreover, the seventh bar graph 92: is a graph corresponding to the total reducible cost when each allocated IT resource allocated to the designated application is deployed in the on-premises 2, the private cloud 3, or the public cloud 4 with the largest reducible cost in the same manner as the third bar graph 73 (FIG. 13) of the first application detailed screen 70 (FIG. 13); and is displayed with the length according to this reducible cost. FIG. 15 shows that the reducible cost becomes the largest when each allocated IT resource is divided and deployed in "Private Cloud #0," "Public Cloud #0," and "Public Cloud #1."

Figure 16:
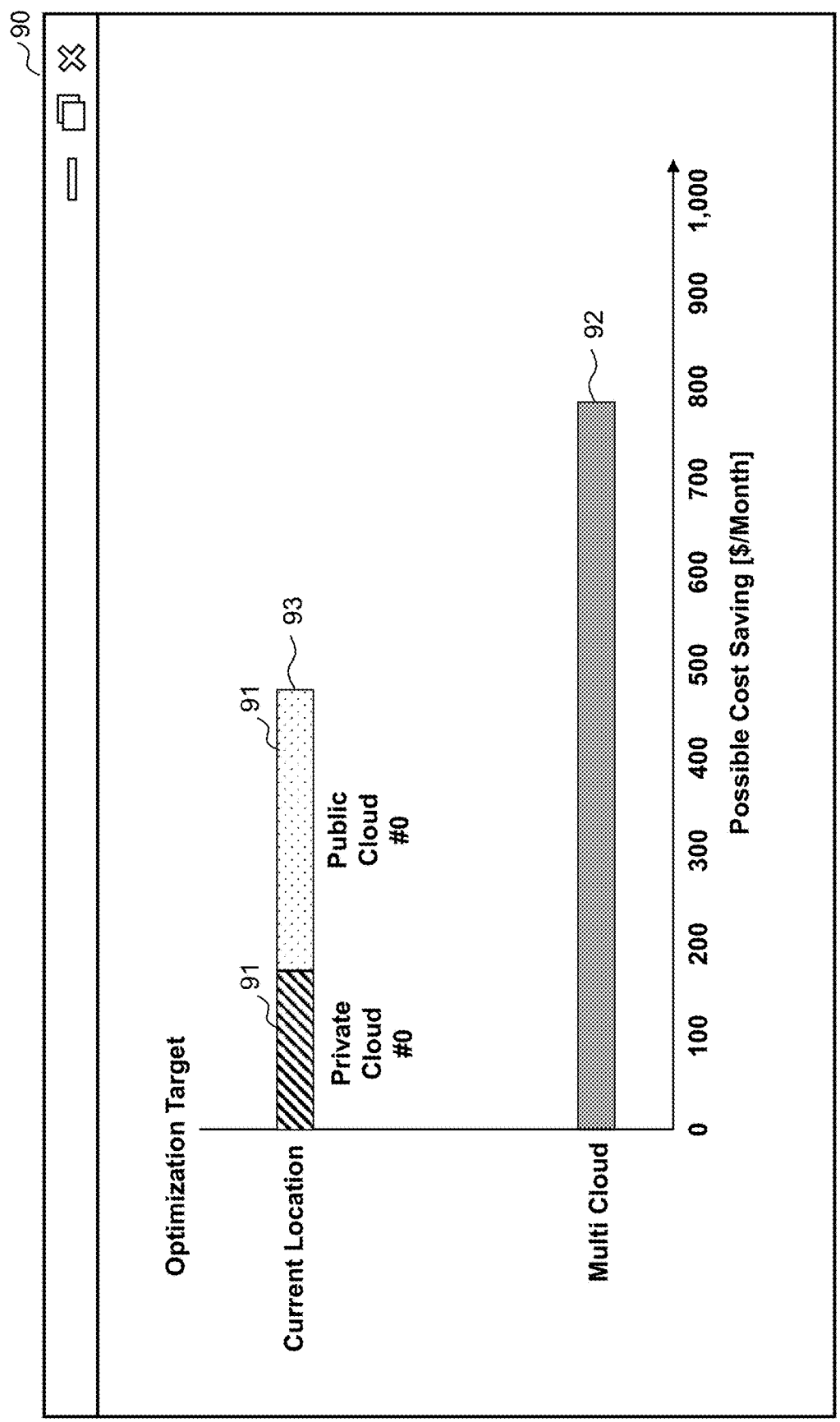
FIG. 16 is a diagram illustrating another display example of the second application detailed screen.

Incidentally, the second application detailed screen 80 in FIG. 15 may be designed to display one eighth bar graph 93 by connecting all the above-described six bar graphs 91 as illustrated in FIG. 16. In this case, different patterns may be used, as illustrated in FIG. 16, or different colors may be used to distinguish between the respective sixth bar graphs 71 which constitute the eighth bar graph 93.

On the other hand, in this embodiment, a reducible cost breakdown screen 100 in which a breakdown of the reducible cost indicated with the first to seventh bar graphs 71, 72, 73, 81, 82, 91, 92 is described as illustrated in FIG. 17 can be overlaid and displayed on the relevant first or second application detailed screen 70, 80 by clicking the first to seventh bar graphs 71, 72, 73, 81, 82, 91, 92 of the first and second application detailed screens 70, 80.

This reducible cost breakdown screen 100 is provided with a target information display area 101; and the application ID of the relevant application, the business unit ID of the relevant business unit which uses that application, and the on-premises ID or the cloud ID of the on-premises 2, the private cloud 3, or the public cloud 4 which is the current deployment location of each allocated IT resource allocated to the application are displayed respectively in in this target information display area.

Moreover, the reducible cost breakdown screen 100 displays a reducible cost breakdown table 102 which indicates, with respect to each IT resource, the on-premises ID or the cloud ID of a current deployment location, the on-premises ID or the cloud ID of a recommended migration destination, a current monthly usage fee, a monthly usage fee of the IT resource after migration to the recommended migration destination, the difference between the current monthly usage fee and the post-migration monthly usage fee, and so on. Specific content of the reducible cost breakdown table 102 is similar to that of the IT resource deployment location candidate management table 37 explained earlier with reference to FIG. 7, except that the business unit ID column 37B, the application ID column 37C, and the minimum cost column 37L are excluded from each row of the corresponding IT resource, so that any detailed explanation about it has been omitted here.

(3) Various Processing Related to IT Resource Deployment Optimization Support Function Next, specific processing content of various processing executed by the administrative server 5 in relation to the aforementioned IT resource deployment optimization support function will be explained. Incidentally, a processing subject of the various processing will be explained as a function unit ("XX unit") below; however, practically, it is needless to say that the CPU 11 (FIG. 1) for the administrative server 5 executes the relevant processing on the basis of the relevant program (the data acquisition program 20, the IT resource deployment location candidate calculation program 21, or the deployment location presentation program 22).

(3-1) On-Premises Menu Unit Price Calculation Processing

Figure 18:
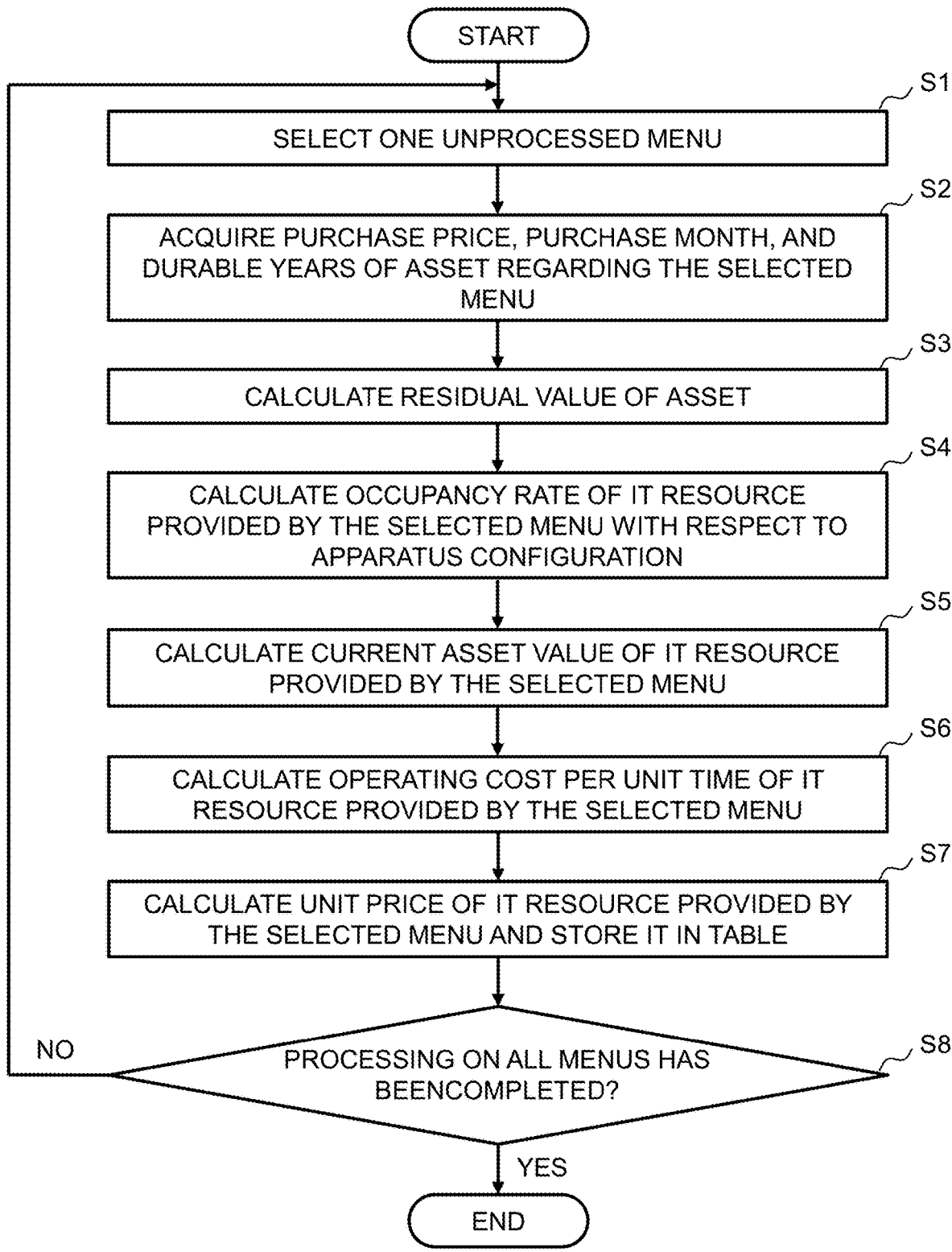
FIG. 18 is a flowchart illustrating a processing sequence for on-premises menu unit price calculation processing.

FIG. 18 illustrates a processing sequence for on-premises menu unit price calculation processing which is regularly executed by the IT resource configuration estimation unit 31A (FIG. 2) for the IT resource deployment location candidate calculation unit 31 (FIG. 2). The IT resource configuration estimation unit 13C regularly updates the unit price of each menu which is stored in each unit price column 36P (FIG. 6) of the on-premises asset information management table 36 (FIG. 6) in accordance with the processing sequence illustrated in this FIG. 18.

Practically, after starting this on-premises menu unit price calculation processing, the IT resource configuration estimation unit 31A firstly selects one menu regarding which step S2 and subsequent steps have not been processed yet, from among menus registered in the on-premises asset information management table 36 (S1).

Subsequently, the IT resource configuration estimation unit 31A: acquires the purchase price, the purchase month, and the durable years which are stored in the asset purchase price column 36D (FIG. 6), the asset purchase month 36E (FIG. 6), and the asset's durable years column 36F (FIG. 6), respectively, in a row corresponding to the menu selected in step S1 (hereinafter referred to as the "selected menu") in the on-premises asset information management table 36 (S2); and calculates a residual value of an IT apparatus (a server apparatus in the case of a compute resource; and a storage apparatus in the case of a storage resource) as an asset which provides the IT resource of the selected menu according to the following expression on the basis of the above-acquired information (S3).

[Math. 1]

$$\text{Residual Value} = \text{Purchase Price} \times (\text{Durable Years} - \text{The Number of Elapsed Years after Purchase})/\text{Durable Years} \quad (1)$$

Next, the IT resource configuration estimation unit 31A: calculates a proportion of the IT resource provided by the selected menu which occupies in the configuration of the entire IT apparatus (S4); and calculates the current asset value of the IT resource provided by the selected menu by multiplying the calculation result in step S3 by the calculation result in step S4 (S5).

Furthermore, the IT resource configuration estimation unit 31A: calculates a cost required for operation per unit time when all the IT resources of this IT apparatus are operated 100%, on the basis of an operating rate of all the IT resources within such IT apparatus in the most recent unit time and an operating cost such as electricity expenses required to operate the IT apparatus during such unit time; and calculates an operating cost per unit time of the IT resource provided by the selected menu by multiplying the above calculation result by the calculation result of step S4 (S6).

Subsequently, the IT resource configuration estimation unit 31A calculates the cost per unit time of the IT resource provided by the selected menu (unit price) by summing up the asset value calculated in step S3 and the operating cost calculated in step S6 and stores the calculation result in the unit price column 36P of a row corresponding to the selected menu in the on-premises asset information management table 36 (S7).

Next, the IT resource configuration estimation unit 31A judges whether or not the execution of the processing in step S2 and subsequent steps has been completed with respect to all the menus registered in the on-premises asset information management table 36 (S8). Then, if the IT resource configuration estimation unit 31A obtains a negative result in this judgment, it returns to step S1 and then repeats the processing in step S1 to step S8 by sequentially switching the menu to be subsequently selected in step S1 to another menu regarding which step S2 and subsequent steps have not been processed yet.

Then, if the IT resource configuration estimation unit 31A eventually obtains an affirmative result in step S8 by completing the calculation of the unit price of all the menus registered in the on-premises asset information management table 36 and the registration of the relevant calculation result in the on-premises asset information management table 36, it terminates this on-premises menu unit price calculation processing.

(3-2) IT Resource Deployment Optimization Support Processing

Figure 19:
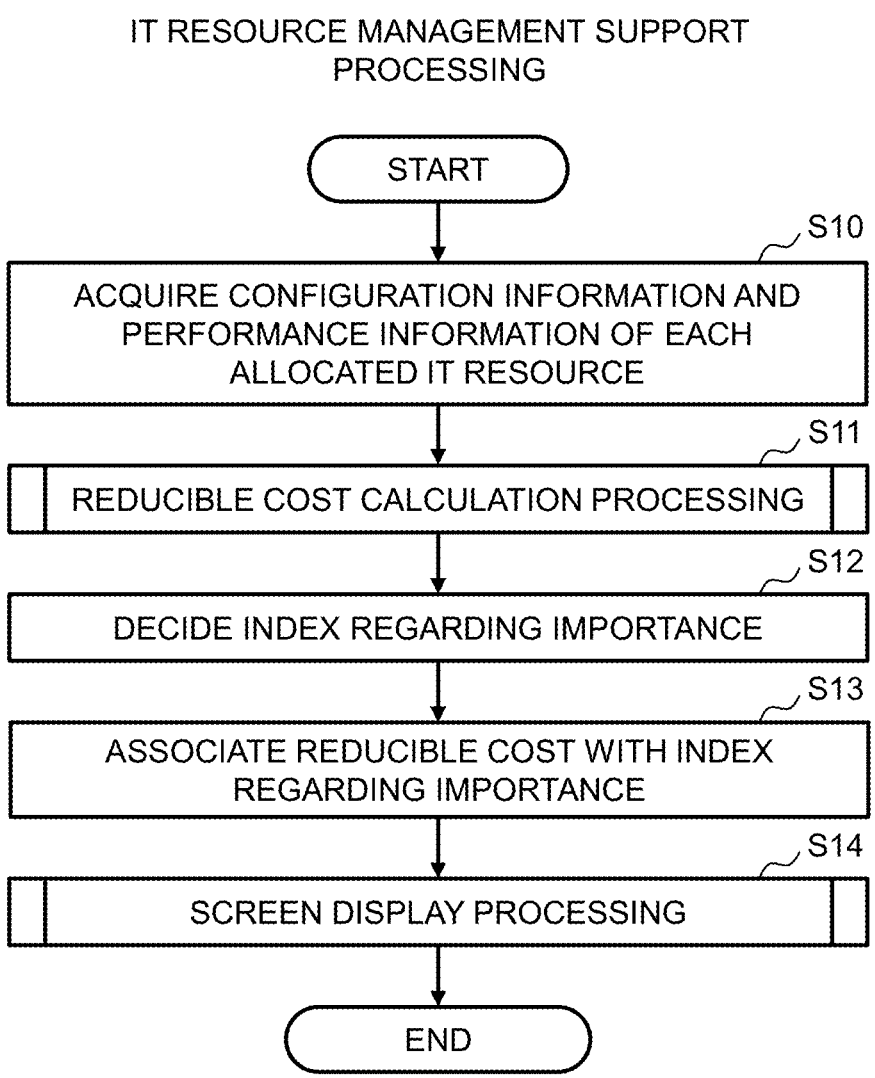
FIG. 19 is a flowchart illustrating a processing sequence for IT resource deployment optimization support processing.

Meanwhile, FIG. 19 illustrates a flow of a sequence of processing executed by the administrative server 5 in relation to the aforementioned IT resource deployment optimization support function (hereinafter referred to as the "IT resource deployment optimization support processing"). This IT resource deployment optimization support processing is started as the user operates the input apparatus 16 (FIG. 1) for the administrative server 5 and issues an instruction to execute the IT resource deployment optimization support processing.

Incidentally, when this happens, the user designates, for example, which display mode should be used among the first and second application detailed screens 70, 80 described earlier with reference to FIG. 13 to FIG. 15 as a display mode for the application detailed screen.

Then, after this IT resource deployment optimization support processing is started, the data acquisition unit 30 (FIG. 2) firstly acquires the configuration information and the performance information of each allocated IT resource from the relevant on-premises 2, private cloud 3, or public cloud 4 and stores each piece of the acquired configuration information and performance information of each allocated IT resource in the IT resource configuration information management table 33 (FIG. 3) and the IT resource performance information management table 34 (FIG. 4), respectively (S10).

Specifically speaking, the IT resource configuration information acquisition unit 30A (FIG. 2) for the data acquisition unit 30 acquires the configuration information of each allocated IT resource from the relevant on-premises 2, private cloud 3, or public cloud 4 and stores these pieces of acquired configuration information in the IT resource configuration information management table 33. Moreover, the IT resource performance information acquisition unit 30B for the data acquisition unit 30 acquires the performance information of the allocated IT resources from the on-premises 2, the private cloud 3, or the public cloud 4, respectively, and stores these pieces of acquired performance information in the IT resource performance information management table 34.

Subsequently, the IT resource deployment location candidate calculation unit 31 (FIG. 2) calculates the optimized configuration of each allocated IT resource on the basis of the information stored respectively in the IT resource configuration information management table 33 (FIG. 3), the IT resource performance information management table 34 (FIG. 4), the IT resource menu information management table 35 (FIG. 5), and the on-premises asset information management table 36 (FIG. 6) and calculates the reducible cost when the deployment of these allocated IT resources is optimized (S11).

Moreover, the IT resource deployment location candidate calculation unit 31 decides the system ranks of the respective business units on the basis of the system ranks of the respective applications, which are used by the respective business units, as an index regarding importance of each business unit (S12). In this embodiment, the highest system rank among the system ranks of the respective applications used by a business unit is decided as the system rank of the relevant business unit as described earlier.

Incidentally, FIG. 19 shows that step S12 is executed after step S11; however, either one of the processing in step S11 and the processing in step S12 may be executed before the other.

Next, the IT resource deployment location candidate calculation unit 31 associates the reducible cost per business unit as calculated in step S11 with the index regarding the importance (system rank) of each business unit as calculated in step S12 (S13).

Subsequently, the visualization unit 32A (FIG. 2) for the deployment location presentation unit 32 (FIG. 2): creates the first IT resource deployment optimization support screen 50 described earlier with reference to FIG. 9 on the basis of the processing result in step S13 and displays it on the display apparatus 17 (FIG. 1); and then executes screen display processing for displaying the second IT resource deployment optimization support screen 60 described earlier with reference to FIG. 11, the first or second application detailed screen 70, 80 described earlier with reference to FIG. 13 to FIG. 15, and the reducible cost breakdown screen 100 described earlier with reference to FIG. 17 on the display apparatus 17 (FIG. 1) as necessary in response to the operation input by the user using the input apparatus 16 (FIG. 1) (S14).

Then, when the user operates the input apparatus 16 (FIG. 1) and issues an instruction to terminate the IT resource deployment optimization support processing, this IT resource deployment optimization support processing is terminated.

Figure 20:
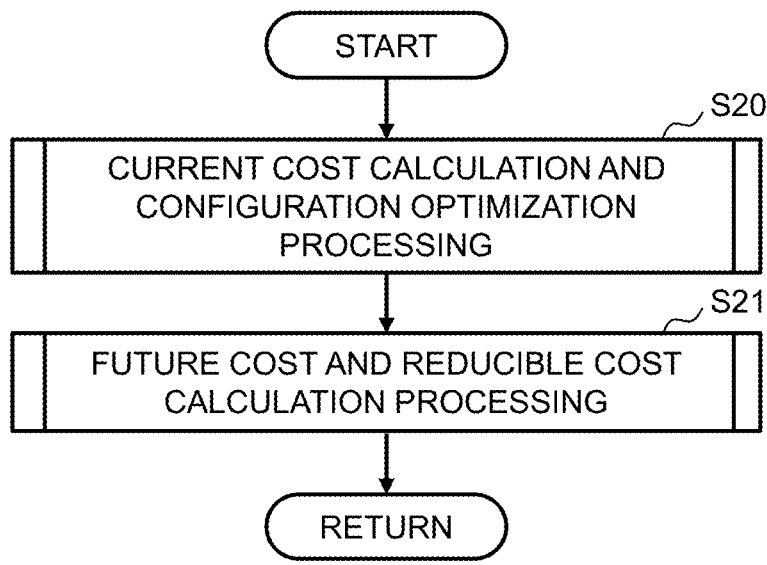
FIG. 20 is a flowchart illustrating a processing sequence for reducible cost calculation processing.

(3-3) Reducible Cost Calculation Processing (3-3-1) Reducible Cost Calculation Processing FIG. 20 illustrates specific processing content of the reducible cost calculation processing which is executed by the IT resource deployment location candidate calculation unit 31 (FIG. 2) in step S11 of the IT resource deployment optimization support processing described earlier with reference to FIG. 19.

As the IT resource deployment optimization support processing proceeds to step S11, the reducible cost calculation processing illustrated in this FIG. 20 is started and the IT resource configuration estimation unit 31A for the IT resource deployment location candidate calculation unit 31 (FIG. 2) firstly executes current cost calculation and configuration optimization processing for calculating the current cost (monthly usage fee) of each allocated IT resource and calculating the optimized configuration of each allocated IT resource while using the prediction result of the variable data prediction unit 31B as necessary (S20).

Subsequently, the IT resource configuration verification unit 31C for the IT resource deployment location candidate calculation unit 31 executes future cost and reducible cost calculation processing for calculating the allocated IT resource deployment location candidate for each allocated IT resource with the optimized configuration and calculating the cost (monthly usage fee) and the reducible cost when each allocated IT resource is migrated to the relevant allocated IT resource deployment location candidate (S21).

Then, the IT resource deployment location candidate calculation unit 31 terminates this reducible cost calculation processing and returns to the IT resource deployment optimization support processing.

(3-3-2) Current Cost Calculation and Configuration Optimization Processing

Figure 21:
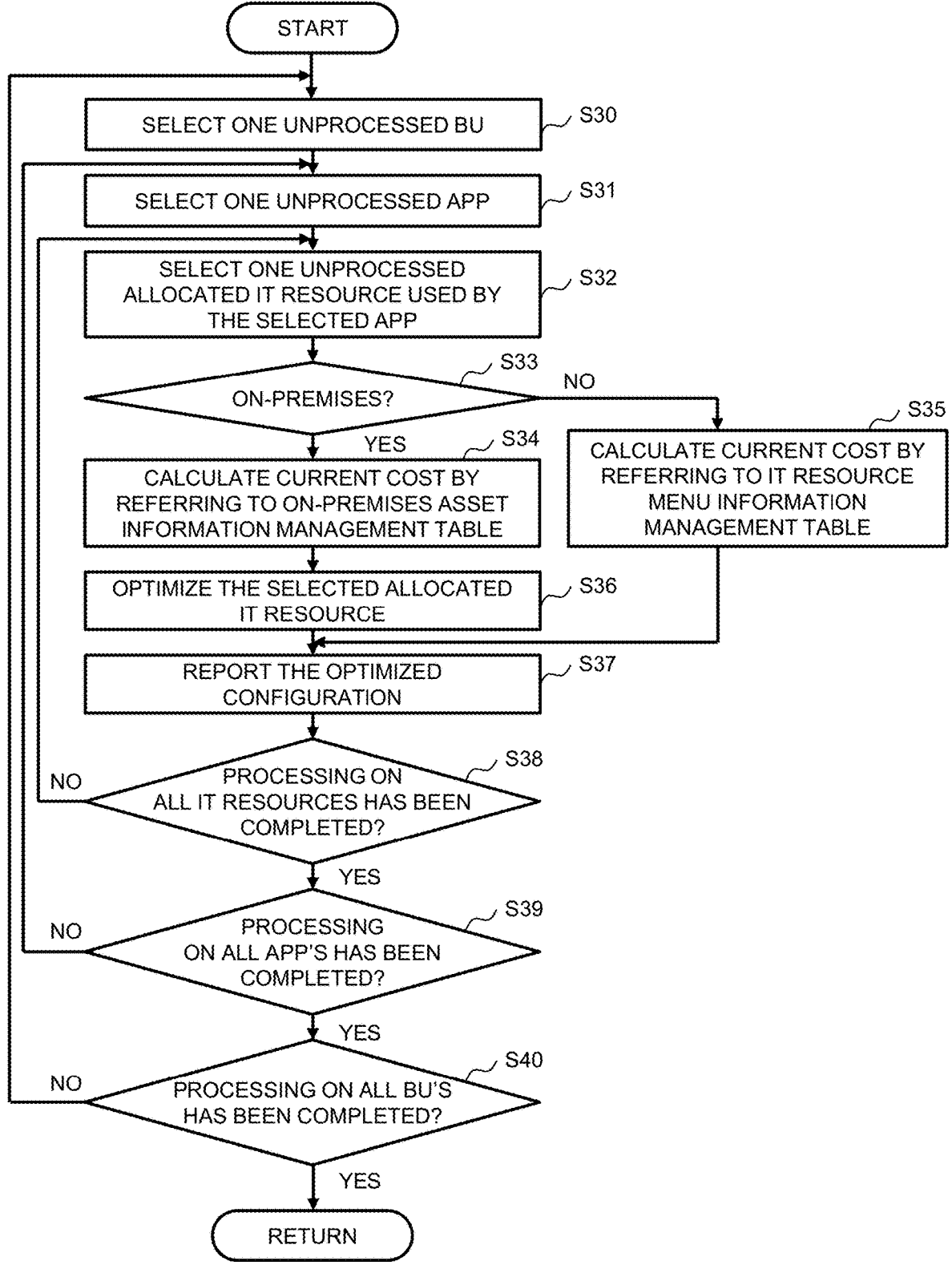
FIG. 21 is a flowchart illustrating a processing sequence for current cost calculation and configuration optimization processing.

FIG. 21 illustrates specific processing content of the current cost calculation and configuration optimization processing which is executed by the IT resource configuration estimation unit 31A for the IT resource deployment location candidate calculation unit 31 in step S20 of the reducible cost calculation processing described earlier with reference to FIG. 20.

As the processing proceeds to step S20 of the reducible cost calculation processing, the IT resource configuration estimation unit 31A starts the current cost calculation and configuration optimization processing illustrated in this FIG. 21 and firstly selects one business unit in the target company, regarding which step S31 and subsequent steps have not been processed yet (S30).

Subsequently, the IT resource configuration estimation unit 31A: selects one application, regarding which step S32 and subsequent steps have not been processed yet, from among applications used by the business unit selected in step S30 (hereinafter referred to as the "selected business unit") (S31); and selects one allocated IT resource, regarding which step S33 and subsequent steps have not been processed yet, from among allocated IT resources used by the selected application (hereinafter referred to as the "selected application") (S32).

Subsequently, the IT resource configuration estimation unit 31A judges whether the current deployment location of the allocated IT resource selected in step S32 (hereinafter referred to as the "selected allocated IT resource") is the on-premises 2 or not (S33). Then, if the IT resource configuration estimation unit 31A obtains an affirmative result in this judgment, it refers to the on-premises asset information management table 36 (FIG. 6) and calculates the current cost (monthly usage fee) of the selected allocated IT resource (S34).

Specifically speaking, the IT resource configuration estimation unit 31A: extracts a menu whose configuration and performance are the closest to those of the selected allocated IT resource among menus registered in the on-premises asset information management table 36 on the basis of the configuration of the selected allocated IT resource and the performance of the selected allocated IT resource, which is registered in the IT resource performance information management table 34 (FIG. 4); and calculates the cost of the selected allocated IT resource on the basis of the extracted menu. This cost can be calculated on the basis of the unit price stored in the unit price column 36P (FIG. 6) of a row corresponding to that menu in the on-premises asset information management table 36.

On the other hand, if the IT resource configuration estimation unit 31A obtains a negative result in the judgment of step S33, it refers to the IT resource menu information management table 35 (FIG. 5) and calculates the current cost of the selected allocated IT resource (S35).

Specifically speaking, the IT resource configuration estimation unit 31A: extracts a menu whose configuration and performance are the closest to those of the selected allocated IT resource among menus registered in the IT resource menu information management table 35 on the basis of the configuration of the selected allocated IT resource and the performance of the selected allocated IT resource, which is registered in the IT resource performance information management table 34; and calculates the cost of the selected allocated IT resource on the basis of the extracted menu. This cost can be calculated on the basis of the unit price stored in the unit price column 35G of a row corresponding to that menu in the IT resource menu information management table 35.

Subsequently, the IT resource configuration estimation unit 31A: calculates the optimum configuration of the selected allocated IT resource from the viewpoint of the current usage status by using an existing method, while using the prediction result of the variable data prediction unit 31B as necessary (S36); and notifies the IT resource configuration verification unit 31C of the calculated configuration, as optimum configuration information of the selected allocated IT resource, together with the IT resource ID of the selected allocated IT resource (S37).

Next, the IT resource configuration estimation unit 31A judges whether or not the execution of the processing in step S33 to step S37 has been completed with respect to all the allocated IT resources used by the selected application (S38). Then, if the IT resource configuration estimation unit 31A obtains a negative result in this judgment, it returns to step S32 and then repeats the processing in step S32 to step S38 by sequentially switching the allocated IT resource to be subsequently selected in step S32 to another unprocessed allocated IT resource used by the selected application.

Then, if the IT resource configuration estimation unit 31A eventually obtains an affirmative result in step S38 by completing the execution of the processing in step S33 to step S37 with respect to all the allocated IT resources used by the selected application, it judges whether or not the execution of the processing in step S32 to step S38 has been completed with respect to all the applications used by the selected business unit (S39).

If the IT resource configuration estimation unit 31A obtains a negative result in this judgment, it returns to step S31 and then repeats the processing in step S31 to step S39 by sequentially switching the application to be subsequently selected in step S31 to another unprocessed application used by the selected business unit.

Then, if the IT resource configuration estimation unit 31A eventually obtains an affirmative result in step S39 by completing the execution of the processing in step S32 to step S38 with respect to all the applications used by the selected business unit, it judges whether or not the execution of the processing in step S31 to step S39 has been completed with respect to all the business units of the target company (S40).

If the IT resource configuration estimation unit 31A obtains a negative result in this judgment, it returns to step S30 and then repeats the processing in step S30 to step S40 by sequentially switching the business unit to be subsequently selected in step S30 to another unprocessed business unit of the target company.

Then, if the IT resource configuration estimation unit 31A eventually obtains an affirmative result in step S40 by completing the execution of the processing in step S31 to step S39 with respect to all the business units of the target company, it terminates this current cost calculation processing and returns to the reducible cost calculation processing.

(3-3-3) Future Cost and Reducible Cost Calculation Processing

Figure 22:
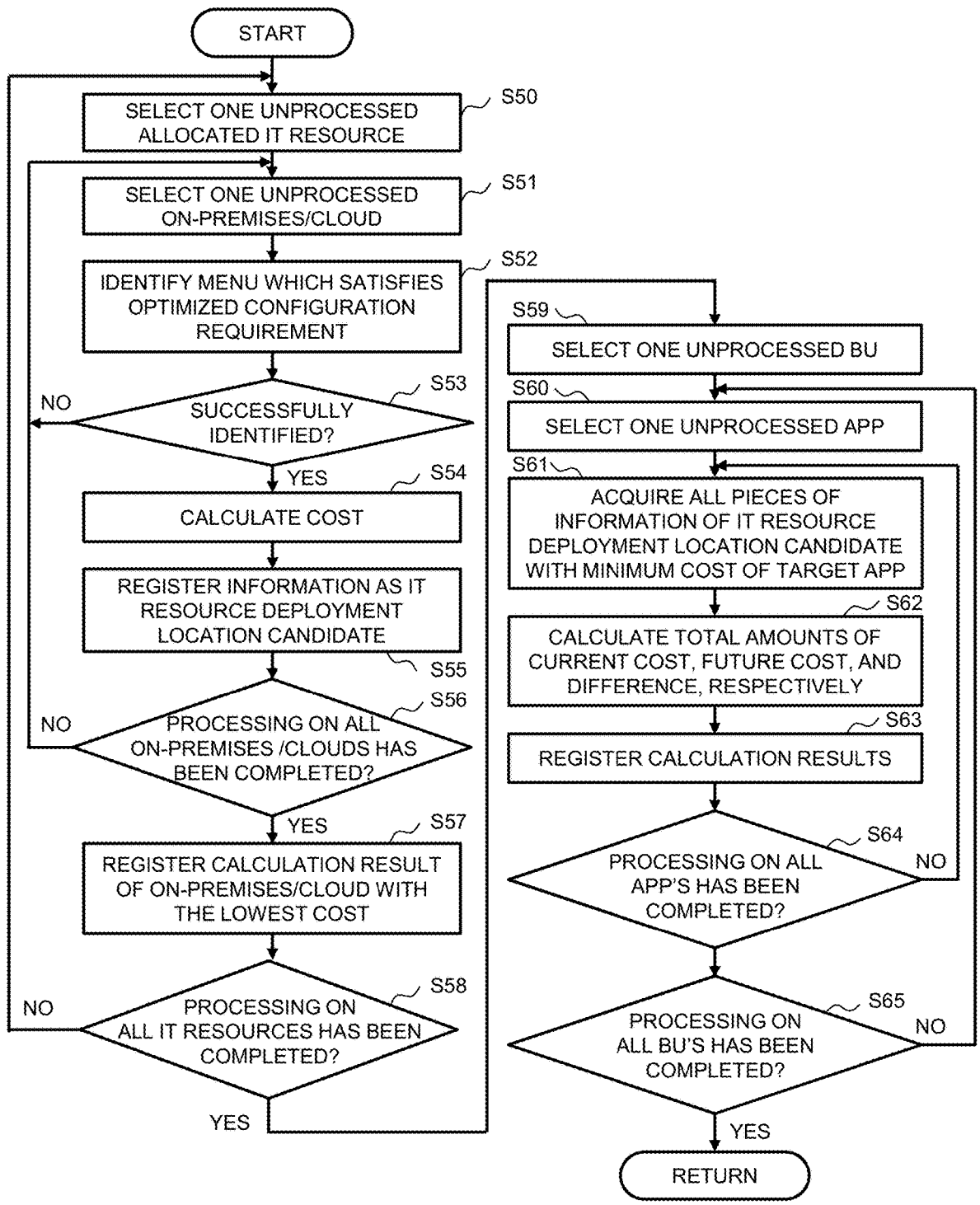
FIG. 22 is a flowchart illustrating a processing sequence for future cost and reducible cost calculation processing.

FIG. 22 illustrates specific processing content of the aforementioned future cost and reducible cost calculation processing executed by the IT resource configuration verification unit 31C in step S21 of the reducible cost calculation processing described earlier with reference to FIG. 20.

Referring to this FIG. 22, as the processing proceeds to step S21 of the reducible cost calculation processing, the IT resource configuration verification unit 31C starts the future cost and reducible cost calculation processing illustrated in this FIG. 22 and firstly selects one allocated IT resource regarding which step S51 and subsequent steps have not been processed yet (S50). The then-selected allocated IT resource will be hereinafter referred to as the "selected allocated IT resource."

Subsequently, the IT resource configuration verification unit 31C selects one on-premises 2, private cloud 3, or public cloud 4 regarding which step S52 and subsequent steps have not been processed yet (S51).

Next, the IT resource configuration verification unit 31C sets the optimized configuration of the selected allocated IT resource as a configuration requirement on the basis of the optimum configuration information of the selected allocated IT resource transmitted from the IT resource configuration estimation unit 31A in step S37 of FIG. 21 with respect to the on-premises 2, the private cloud 3, or the public cloud 4 selected in step S51 (hereinafter referred to as the "selected on-premises/cloud") and identifies a menu(s) for the selected on-premises/cloud, which satisfies the configuration requirement (S52).

Specifically speaking, if the selected on-premises/cloud is the private cloud 3 or the public cloud 4, the IT resource configuration verification unit 31C identifies all menus which satisfy the configuration requirement after the optimization of the selected allocated IT resource from among the respective menus registered in the IT resource menu information management table 35 (FIG. 5).

For example, if the optimized configuration of the selected allocated IT resource is designed so that the quantity of CPUs is "1," the CPU clock is "2.0 [GHz]," and the memory size is "4 [GB]," the IT resource configuration verification unit 31C identifies a menu with the menu ID "Menu000" and a menu with the menu ID "Menu010" in the example illustrated in FIG. 5 as the menus which satisfy the configuration requirement after the optimization of the selected allocated IT resource. Moreover, if the optimized configuration of the selected allocated IT resource is designed so that the quantity of CPUs is "2," the CPU clock is "3.6 [GHz]," and the memory size is "4 [GB]," the IT resource configuration verification unit 31C identifies only the menu with the menu ID "Menu010" in the example illustrated in FIG. 5 as the menu which satisfies the configuration requirement after the optimization of the selected allocated IT resource.

Moreover, if the selected on-premises/cloud is the on-premises, the IT resource configuration verification unit 31C identifies a menu(s) which satisfies the configuration requirement after the optimization of the selected allocated IT resource from among the menus stored in the on-premises asset information management table 36 (FIG. 6) in the same manner as described above.

Subsequently, the IT resource configuration verification unit 31C judges whether the menu(s) for the selected on-premises/cloud which satisfies the configuration requirement for the selected allocated IT resource has been successfully identified or not in step S52 (S53). Then, if the IT resource configuration verification unit 31C obtains a negative result in this judgment, it returns to step S51 and then executes the processing in step S51 and subsequent steps in the same manner as described above by sequentially switching the on-premises/the cloud to be subsequently selected in step S51 to another on-premises 2 or cloud (private cloud 3 or public cloud 4) regarding which step S52 and subsequent steps have not been processed yet.

On the other hand, if the IT resource configuration verification unit 31C obtains an affirmative result in step S53, it calculates the cost (monthly usage fee) required when the IT resource configuration for each menu identified in step S52 is adopted (S54).

Moreover, the IT resource configuration verification unit 31C recognizes the respective IT resource configurations of all the menus identified in step S52 as IT resource deployment location candidates for the selected allocated IT resource and registers necessary information about these IT resource deployment location candidates in the IT resource deployment location candidate management table 37 (FIG. 7), respectively, by associating the information with the cost calculated in step S54 (S55).

Next, the IT resource configuration verification unit 31C judges whether or not the execution of the processing in step S51 to step S55 has been completed with respect to all the on-premises 2, the private clouds 3, and the public clouds 4 regarding the selected allocated IT resource (S56). Then, if the IT resource configuration verification unit 31C obtains a negative result in this judgment, it returns to step S51 and then repeats the processing in step S51 to step S56 by sequentially switching the on-premises 2, the private cloud 3, or the public cloud 4 to be subsequently selected in step S51 to another on-premises 2, private cloud 3, or public cloud 4 regarding which step S52 and subsequent steps have not been processed yet.

Then, if the IT resource configuration verification unit 31C eventually obtains an affirmative result in step S56 by completing the execution of the processing in step S52 to step S55 with respect to all the on-premises 2, the private clouds 3, and the public clouds 4 regarding the selected allocated IT resource, the IT resource configuration verification unit 31C: stores "Yes" in the minimum cost column 37L corresponding to an IT resource deployment location candidate with the lowest cost (monthly usage fee), in the minimum cost column 37L (FIG. 7) of the IT resource deployment location candidate management table 37 and from among the respective IT resource deployment location candidates for the selected allocated IT resource, which are registered in the IT resource deployment location candidate management table 37; and stores "No" in each minimum cost column corresponding to other IT resource deployment location candidates for the selected allocated IT resource (S57).

Subsequently, the IT resource configuration verification unit 31C judges whether or not the execution of the processing in step S51 to step S57 has been completed with respect to all the allocated IT resources used by the target company (S58). Then, if the IT resource configuration verification unit 31C obtains a negative result in this judgment, it returns to step S50 and then repeats the processing in step S50 to step S58 in the same manner by sequentially switching the allocated IT resource to be subsequently selected in step S50 to another allocated IT resource regarding which step S51 and subsequent steps have not been processed yet.

Then, if the IT resource configuration verification unit 31C eventually obtains an affirmative result in step S58 by completing the execution of the processing in step S51 to step S57 with respect to all the allocated IT resources used by the target company, it executes the processing in step S59 and subsequent steps in order to create the deployment location summary information management table 38 (FIG. 8).

Specifically speaking, the IT resource configuration verification unit 31C firstly selects one business unit regarding which step S60 and subsequent steps have not been processed yet (S59). Moreover, the IT resource configuration verification unit 31C selects one application regarding which step S60 and subsequent steps have not been processed yet, from among the applications used by the business unit selected in step S58 (hereinafter referred to as the "target business unit") (S60).

Subsequently, the IT resource configuration verification unit 31C acquires all pieces of information about the IT resource deployment location candidate with the minimum cost from among the IT resource deployment location candidates corresponding to the allocated IT resource with respect to each allocated IT resource used by the application selected in step S60 (hereinafter referred to as the "target application") (S61). Specifically speaking, the IT resource configuration verification unit 31C acquires, from among every row of the IT resource deployment location candidate management table 37, information of all rows in which the business unit ID of the target business unit is stored in the business unit column 37B (FIG. 7), the application ID of the target application is stored in the application ID column 37C (FIG. 7), and "Yes" is stored in the minimum cost column 37L (FIG. 7).

Next, the IT resource configuration verification unit 31C calculates, among the information of the respective rows acquired in step S61: a total amount of the current monthly usage fees respectively stored in the current monthly usage fee column 37I (FIG. 7) of the respective rows; a total amount of the post-migration monthly usage fees respectively stored in the post-migration monthly usage fee column 37J (FIG. 7) of the respective rows; and a total amount of the differences between the current monthly usage fees and the post-migration monthly usage fees respectively stored in the monthly usage fee difference column 37K (FIG. 7) of the respective rows (S62). Then, the IT resource configuration verification unit 31C registers these calculation results, together with other necessary information, in the deployment location summary information management table 38 (S63).

Moreover, the IT resource configuration verification unit 31C judges whether or not the execution of the processing in step S61 and subsequent steps has been completed with respect to all the applications used by the target business unit (S64).

Then, if the IT resource configuration verification unit 31C obtains a negative result in this judgment, it returns to step S60 and then repeats the processing in step S60 to step S64 by sequentially switching the application to be subsequently selected in step S60 to another application regarding which step S61 and subsequent steps have not been processed yet.

Then, if the IT resource configuration verification unit 31C eventually obtains an affirmative result in step S64 by completing the execution of the processing in step S61 and subsequent steps with respect to all the applications used by the target business unit, it judges whether or not the execution of the processing in step S60 and subsequent steps has been completed with respect to all the business units (S65).

Then, if the IT resource configuration verification unit 31C obtains a negative result in this judgment, it returns to step S59 and then repeats the processing in step S59 to step S65 by sequentially switching the business unit to be subsequently selected in step S59 to another business unit regarding which step S60 and subsequent steps have not been processed yet.

Then, if the IT resource configuration verification unit 31C eventually obtains an affirmative result in step S65 by completing the execution of the processing in step S60 and subsequent steps with respect to all the business units of the target company, it terminates this future cost and reducible cost calculation processing and returns to the reducible cost calculation processing.

Figure 23:
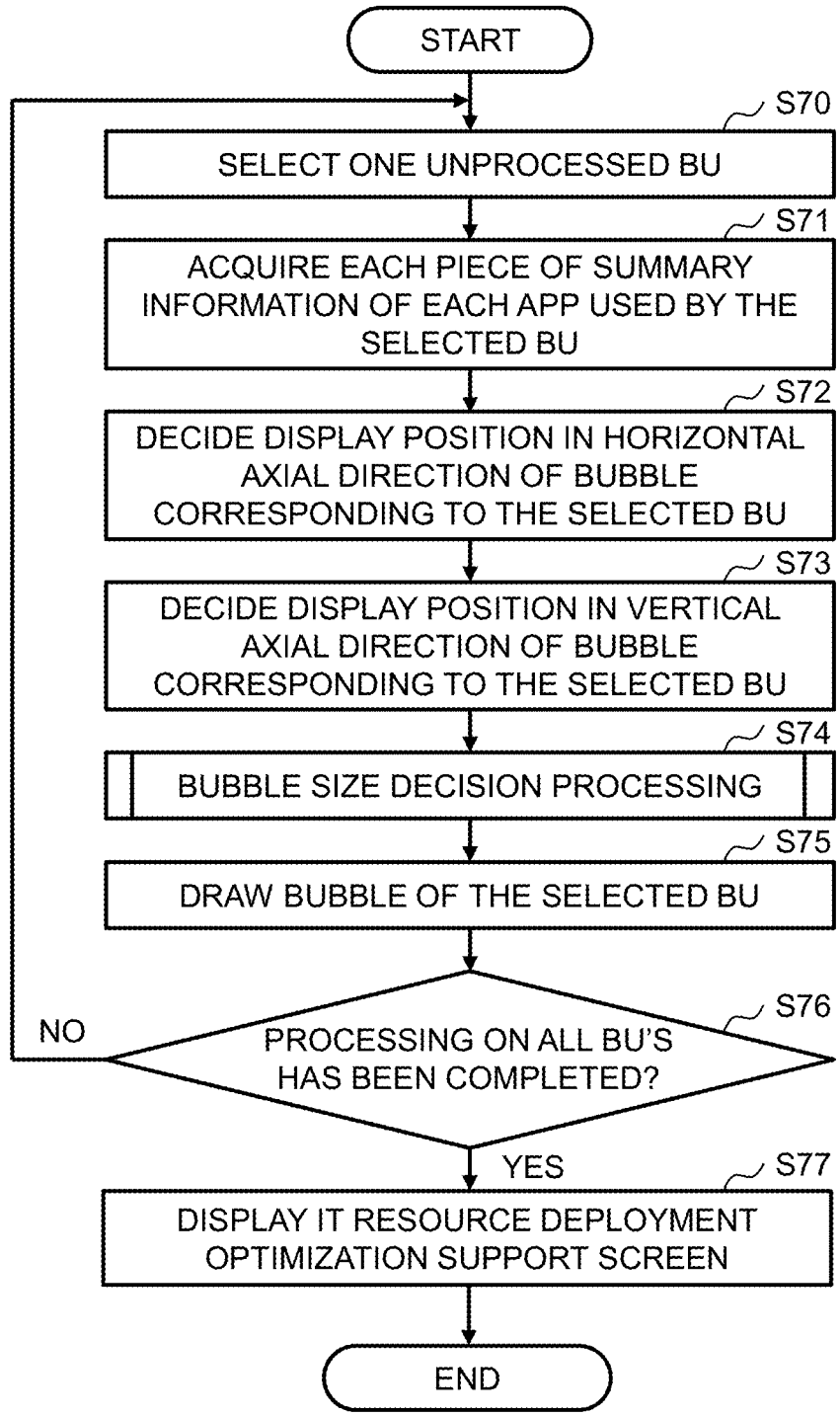
FIG. 23 is a flowchart illustrating a processing sequence for IT resource deployment optimization support screen display processing.

(3-4) Screen Display Processing (3-4-1) IT Resource Deployment Optimization Support Screen Display Processing FIG. 23 illustrates a processing sequence for the IT resource deployment optimization support screen display processing executed to display the first IT resource deployment optimization support screen 50 described earlier with reference to FIG. 9 on the display apparatus 17 (FIG. 1) during the screen display processing executed by the visualization unit 32A (FIG. 2) in step S14 of the IT resource deployment optimization support processing described earlier with reference to FIG. 19. The visualization unit 32A displays the first IT resource deployment optimization support screen 50 described earlier with reference to FIG. 9 on the display apparatus 17 (FIG. 1) in accordance with the processing sequence illustrated in this FIG. 23.

Practically, as the IT resource deployment optimization support processing proceeds to step S14, the visualization unit 32A starts the IT resource deployment optimization support screen display processing illustrated in this FIG. 23 and firstly selects one business unit regarding which step S71 and subsequent steps have not been processed yet, from among the respective business units of the target company.

Subsequently, the visualization unit 32A acquires summary information about each application used by the business unit selected in step S70 (hereinafter referred to as the "selected business unit") (S71). Specifically speaking, the visualization unit 32A acquires data of all rows corresponding to the selected business unit (all rows with the business unit ID of the selected business unit stored in the business unit ID column 37B), as the summary information of the relevant application, from the deployment location summary information management table 37 (FIG. 7) by using the business unit ID of the selected business unit as a search key.

Next, the visualization unit 32A decides the maximum value of system ranks that are previously set to the respective applications used by the selected business unit, regarding which the summary information was acquired in step S71, to be the system rank of the selected business unit and decides a horizontal-axis-direction display position of a first bubble 54 (FIG. 9) corresponding to the selected business unit to be displayed on the plane coordinates 53 (FIG. 9) in the bubble display area 51 (FIG. 9) of the first IT resource deployment optimization support screen 50 (FIG. 9) (S72).

Moreover, the visualization unit 32A decides a vertical-axis-direction display position of the first bubble 54 corresponding to the selected business unit to be displayed on the plane coordinates 53 in the bubble display area 51 of the first IT resource deployment optimization support screen 50 on the basis of the summary information of each application as acquired in step S71 (S73). Specifically speaking, the visualization unit 32A: calculates a total amount of the monthly usage fee differences respectively stored in the monthly usage fee difference column 38I (FIG. 8) of the respective rows corresponding to these applications in the deployment location summary information management table 38I (FIG. 8); and decides the vertical-axis-direction display position of the first bubble 54 by using the calculated total amount as the maximum value of the reducible cost of the selected business unit.

Furthermore, the visualization unit 32A: decides the size of the first bubble 54 corresponding to the selected business unit on the basis of the total cost of the IT resource used by the selected business unit (S74); and then draws the first bubble 54 of the size decided in step S74 at the coordinate position identified based on the horizontal-axis-direction position decided in step S72 and the vertical-axis-direction position decided in step S73 on the plane coordinates 53 of the first IT resource deployment optimization support screen 50 (S75).

Subsequently, the visualization unit 32A judges whether or not the execution of the processing in step S71 to step S75 has been completed with respect to all the business units of the target company (S76). Then, if the visualization unit 32A obtains a negative result in this judgment, it returns to step S70 and then repeats the processing in step S70 to step S76 by sequentially switching the business unit to be subsequently selected in step S70 to another business unit regarding which step S71 and subsequent steps have not been processed yet.

Then, if the visualization unit 32A eventually obtains an affirmative result in step S76 by finishing drawing bubbles respectively corresponding to all the business units of the target company on the plane coordinates 53 of the first IT resource deployment optimization support screen 50, it causes the display apparatus 17 to display this first IT resource deployment optimization support screen 50 (S77) and then terminates this IT resource deployment optimization support screen display processing.

Figure 24:
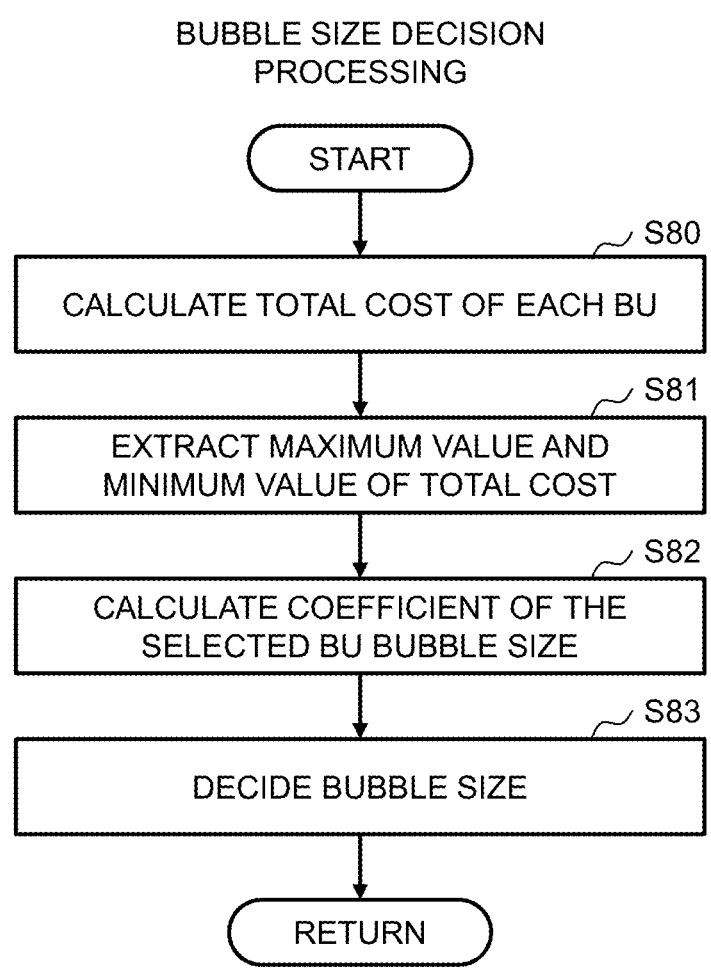
FIG. 24 is a flowchart illustrating a processing sequence for bubble size decision processing.

FIG. 24 illustrates specific processing content of the visualization unit 32A in step S74 of the IT resource deployment optimization support screen display processing. As the processing proceeds to step S74 of the IT resource deployment optimization support screen display processing, the visualization unit 32A starts the bubble size decision processing illustrated in FIG. 24.

Then, the visualization unit 32A firstly calculates the current total cost of each business unit of the target company (S80). The total cost of each business unit can be calculated by searching the deployment location summary information management table 38 (FIG. 8) by using its business unit ID as a search key, and summing up the current monthly usage fees respectively stored in the current monthly usage fee column 38G (FIG. 8) of the respective detected rows.

Subsequently, the visualization unit 32A extracts the maximum value and the minimum value of the total costs of the respective business units as acquired in step S80 (S81).

Next, the visualization unit 32A calculates a coefficient for the bubble size of the business unit selected in step S70 (selected business unit) of the IT resource deployment optimization support screen display processing described earlier with reference to FIG. 23 (S82). Specifically speaking, the visualization unit 32A calculates a value obtained by dividing the difference between the total cost of the selected business unit, which was calculated in step S80, and the minimum value extracted in step S81 by the difference between the maximum value and the minimum value which were acquired in step S81, as the coefficient for the bubble size of the selected business unit.

Furthermore, the visualization unit 32A calculates, as a final bubble size of the selected business unit, a value obtained by multiplying the difference between a maximum bubble size and a minimum bubble size, which are set in advance, by the coefficient calculated in step S82 and adding the calculation result to the minimum bubble size (S83). Then, the visualization unit 32A returns to the IT resource deployment optimization support screen display processing.

Incidentally, if any one of the first bubbles 54 (FIG. 9) displayed on the plane coordinates 53 (FIG. 9) in the bubble display area 51 (FIG. 9) of the first IT resource deployment optimization support screen 50 is then clicked, the visualization unit 32A displays the second IT resource deployment optimization support screen 60 described earlier with reference to FIG. 11 on the display apparatus 17; however, the content of the processing executed this time is almost similar to the processing content of FIG. 23 and FIG. 24, so any explanation about it has been omitted here.

(3-4-2) First Application Detailed Screen Display Processing

Figure 25:
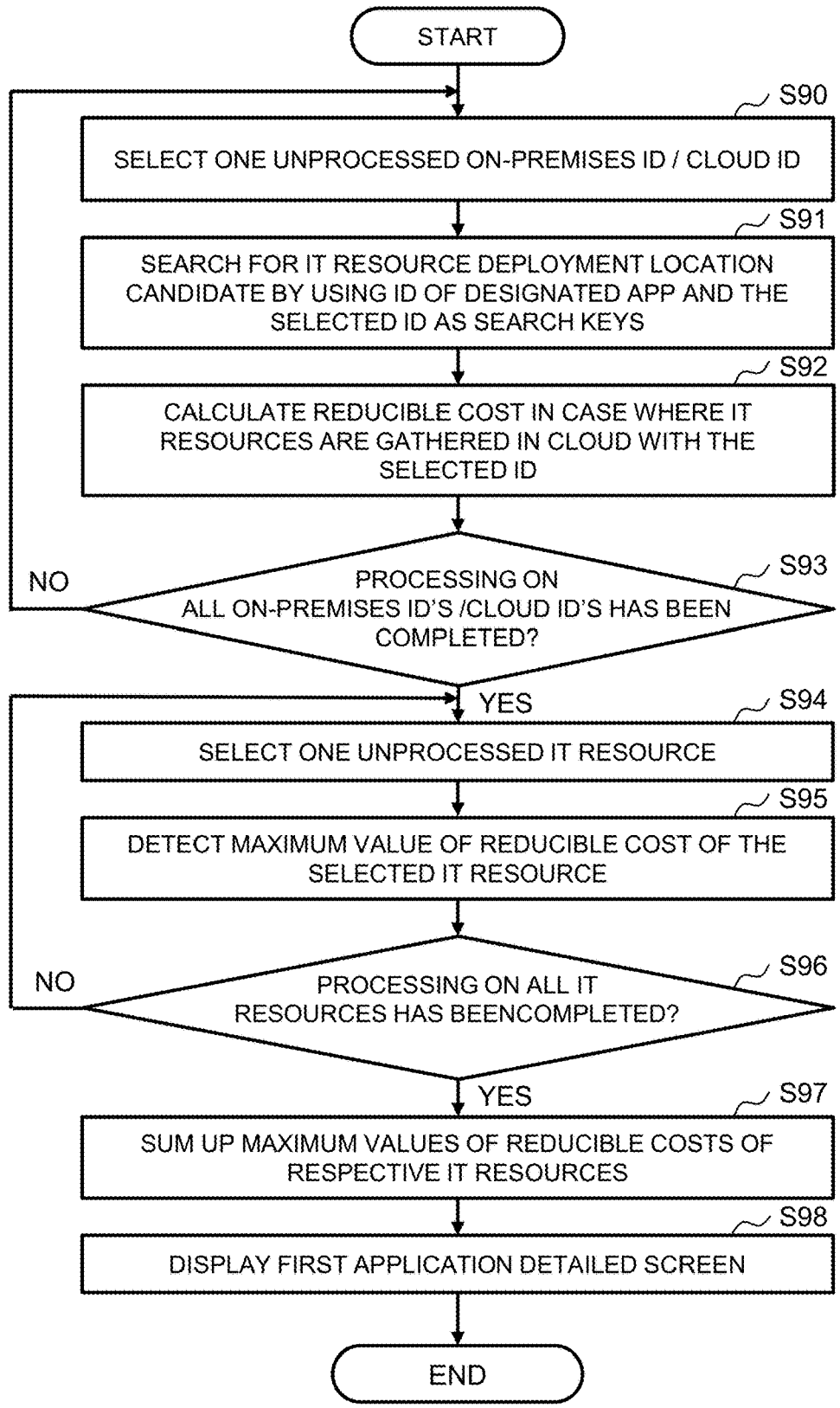
FIG. 25 is a flowchart illustrating a processing sequence for first application detailed screen display processing.

Meanwhile, FIG. 25 illustrates a processing sequence for the first application detailed screen display processing executed by the visualization unit 32A when the application detailed screen designated by the instruction to execute the IT resource deployment optimization support processing as described earlier is the first application detailed screen 70 described earlier with reference to FIG. 13 and when any one of the second bubbles 64 (FIG. 11) on the second IT resource deployment optimization support screen 60 (FIG. 11) is clicked.

The visualization unit 32A creates the first application detailed screen 70 described earlier with reference to FIG. 13 regarding the application corresponding to the second bubble 64 designated by being clicked (hereinafter referred to as the "designated application") in accordance with the processing sequence illustrated in this FIG. 25 and displays this screen on the display apparatus 17 (FIG. 1).

Practically, when any one of the second bubbles 64 is clicked on the second IT resource deployment optimization support screen 60 (FIG. 11), the visualization unit 32A: starts the first application detailed screen display processing illustrated in this FIG. 25; and firstly selects one on-premises ID or cloud ID regarding which step S91 and subsequent steps have not been processed yet, from among the on-premises IDs or the cloud IDs stored in the post-migration deployment location ID column 37F of the respective rows in the IT resource deployment location candidate management table 37 (FIG. 7) (S90). The then-selected on-premises ID or cloud ID will be hereinafter referred to as the selected ID.

Subsequently, the visualization unit 32A searches the IT resource deployment location candidate management table 37 for an IT resource deployment location candidate(s) regarding which the application ID of the designated application is stored in the application ID column 37C (FIG. 7) of the corresponding row and the selected ID is stored in the post-migration deployment location ID column 37F of that row (S91).

Next, the visualization unit 32A sums up all the reducible costs stored respectively in the monthly usage fee difference column 37K (FIG. 7) of the respective IT resource deployment location candidates detected by the search of the IT resource deployment location candidate management table 37 in step S91 (S92). As a result of this sum-up calculation, the reducible cost of the case where all the respective IT resources used by the designated application are integrated in the on-premises 2, the private cloud 3, or the public cloud 4 with the selected ID is calculated.

Furthermore, the visualization unit 32A judges whether or not the execution of the processing in step S91 and subsequent steps has been completed with respect to all the on-premises IDs/cloud IDs stored in the post-migration deployment location ID column 37F (FIG. 7) of the respective rows of the IT resource deployment location candidate management table 37 (S93). Then, if the visualization unit 32A obtains a negative result in this judgment, it returns to step S90 and then repeats the processing in step S90 to step S93 by sequentially switching the on-premises ID/cloud ID to be subsequently selected in step S90 to another unprocessed on-premises ID/cloud ID which falls under the above-described condition. As a result of this repeated processing, the values of the reducible costs respectively indicated by the first and second bar graphs 71, 72 (FIG. 13) can be calculated, respectively.

Then, if the visualization unit 32A eventually obtains an affirmative result in step S93 by completing the execution of the processing in step S91 and subsequent steps with respect to all the on-premises IDs/cloud IDs stored in the post-migration deployment location ID column 37F of the respective rows in the IT resource deployment location candidate management table 37, it selects one IT resource regarding which step S95 and subsequent steps have not been processed yet, from among the IT resources used by the designated application (S94).

Subsequently, the visualization unit 32A detects the maximum monthly usage fee difference (reducible cost) from among the monthly usage fee differences (reducible costs) respectively stored in the monthly usage fee difference column 37K of the respective rows in which the IT resource selected in step S94 is stored in the resource ID column 37A (FIG. 7) of the IT resource deployment location candidate management table 37 (S95).

Next, the visualization unit 32A judges whether or not the execution of the processing in step S95 has been completed with respect to all the IT resources used by the designated application (the allocated IT resources) (S96). Then, if the visualization unit 32A obtains a negative result in this judgment, it returns to step S94 and then repeats the processing in step S94 to step S96 by sequentially switching the IT resource to be subsequently selected in step S94 to another IT recourse regarding which step S95 has not been processed yet.

Subsequently, if the visualization unit 32A obtains an affirmative result in step S96 by finishing detecting the maximum values of the reducible costs with respect to all the IT resources used by the designated application, it sums up all these maximum values of the reducible costs (S97). The then-calculated total amount corresponds to the value of the reducible cost indicated by the third bar graph 73 on the first application detailed screen 70 in FIG. 13.

Furthermore, the visualization unit 32A creates the first application detailed screen 70 described earlier with reference to FIG. 13 on the basis of the processing results of step S90 to step S97 and causes the display apparatus 17 to display this first application detailed screen 70 (S98). Then, the visualization unit 32A terminates this first application detailed screen display processing.

(3-4-3) Second Application Detailed Screen Display Processing

Meanwhile, FIG. 26 illustrates a processing sequence for the second application detailed screen display processing executed by the visualization unit 32A when the application detailed screen designated by the instruction to execute the IT resource deployment optimization support processing as described earlier is the second application detailed screen 80 described earlier with reference to FIG. 14 and when any one of the second bubbles 64 (FIG. 11) is clicked on the second IT resource deployment optimization support screen 60 (FIG. 11).

The visualization unit 32A creates the second application detailed screen 80 described earlier with reference to FIG. 14 regarding the application corresponding to the second bubble 64 designated by being clicked (the designated application) in accordance with the processing sequence illustrated in this FIG. 25 and causes the display apparatus 17 (FIG. 1) to display this second application detailed screen 80.

Practically, when any one of the second bubbles 64 is clicked on the second IT resource deployment optimization support screen 60 (FIG. 11), the visualization unit 32A starts the second application detailed screen display processing illustrated in this FIG. 26 and firstly resets counters which are provided corresponding respectively to each on-premises 2, each private cloud 3, each public cloud 4, and a recommended deployment location (a combination of deployment locations which will most reduce the reducible cost) (these counters will be hereinafter referred to as the "reducible cost counters"), respectively, in order to count the reducible cost (S100).

Subsequently, the visualization unit 32A selects one IT resource regarding which step S102 and subsequent steps have not been processed yet, from among IT resources used by the application corresponding to the second bubble 64 clicked on the IT resource deployment optimization support screen 60 which was displayed immediately before (S101).

Next, the visualization unit 32A adds a value stored in the monthly usage fee difference column 37K (FIG. 7) of a row which corresponds to the IT resource selected in step S101 and regarding which the on-premises ID/cloud ID stored in the current deployment location ID column 37D (FIG. 7) matches the on-premises ID/cloud ID stored in the post-migration deployment location ID 37F (FIG. 7), among the respective rows of the IT resource deployment location candidate management table 37 (FIG. 7), to the count value of the reducible cost counter for the recommended deployment location (S102).

Moreover, the visualization unit 32A adds a value stored in the monthly usage fee difference column 37K of a row which corresponds to the designated application (the row with the application ID of the designated application stored in the application ID column 37C (FIG. 7)) and regarding which "Yes" is stored in the minimum cost column 37L (FIG. 7), among the respective rows of the IT resource deployment location candidate management table 37, to the count value of the reducible cost counter for the recommended deployment location of the relevant IT resource (S103).

Next, the visualization unit 32A judges whether or not the execution of the processing in step S102 and step S103 has been completed with respect to all the IT resources used by the designated application (S104). Then, if the visualization unit 32A obtains a negative result in this judgment, it returns to step S101 and then repeats the processing in step S101 to step S104 by switching the IT resource to be subsequently selected in step S101 to another IT resource regarding which step S102 and subsequent steps have not been processed yet.

Then, if the visualization unit 32A eventually obtains an affirmative result in step S104 by completing the execution of the processing in step S102 and step S103 with respect to all the IT resources used by the designated application, it creates the second application detailed screen 80 described earlier with reference to FIG. 14 on the basis of the processing results which have been obtained above, and causes the display apparatus 17 to display the second application detailed screen 80 (S105). Then, the visualization unit 32A terminates this second application detailed screen display processing.

(4) Advantageous Effects of this Embodiment

The IT resource deployment optimization support system 1 according to this embodiment as described above acquires the configuration information and the performance information of each allocated IT resource from the relevant on-premises 2, private cloud 3, and public cloud 4 and displays various kinds of screens described earlier with reference to FIG. 9 to FIG. 17 on the display apparatus 17 (FIG. 1) for the administrative server 5 (FIG. 1) on the basis of these pieces of acquired information and the menu information stored in the on-premises asset information management table 36 (FIG. 6) and the IT resource deployment location candidate management table 37 (FIG. 7).

In this case, for example, on the first and second IT resource deployment optimization support screens 50, 60 (FIG. 9 and FIG. 11), a business unit or an application whose relevant first or second bubble 54, 64 is displayed in a lower right part of the plane coordinates 53, 63 is of a higher system rank and has a lower reducible cost when the deployment of IT resources used by the relevant business unit or application (allocated IT resources) is optimized; and, therefore, it is possible to judge that these allocated IT resources have low priorities for a review of the deployment.

Contrarily, a business unit or an application whose relevant first or second bubble 54, 64 is displayed in an upper left part of the plane coordinates 53, 63 is of a lower system rank and has a higher reducible cost when the deployment of IT resources used by the relevant business unit or application is optimized; and, therefore, it is possible to judge that these allocated IT resources have high priorities for the review of the deployment.

Therefore, the user can easily judge the allocated IT resources whose deployment locations to be reviewed and their priorities in consideration of both the importance of the business units and the applications, and the cost reduction effect by referring to the first IT resource deployment optimization support screen 50 and the second IT resource deployment optimization support screen 60. Therefore, the IT resource deployment optimization support system capable of facilitating the work to optimize the deployment locations of the IT resources can be implemented according to this embodiment.

Moreover, with this IT resource deployment optimization support system 1, the first or second application detailed screen 70, 80 described earlier with reference to FIG. 13 to FIG. 15 can be displayed on the display apparatus 17 by clicking and thereby selecting any one of the second bubbles 64 on the second IT resource deployment optimization support screen 60. Therefore, the user can easily judge whether the respective allocated IT resources which are allocated to the application corresponding to the then-selected second bubble 64 should better be optimized while keeping their current deployment or the respective allocated IT resources should better be deployed at deployment locations which will most increase their respective reducible costs.

In addition, this IT resource deployment optimization support system 1 can cause the display apparatus 17 to display the reducible cost breakdown screen 100 described earlier with reference to FIG. 17 in which the breakdown of the reducible costs represented by the first to seventh bar graphs 71, 72, 73, 81, 82, 91, 92 is indicated, by clicking the first to seventh bar graphs 71, 72, 73, 81, 82, 91, 92 on the first or second application detailed screen 70, 80. So, it is possible to facilitate the above-mentioned judgment by referring to this reducible cost breakdown screen 100.

(5) Other Embodiments

Incidentally, the aforementioned embodiment has described the case where each first or second bubble 54, 64 is displayed with the size according to the total cost before the optimization of the deployment of the IT resources used by the relevant business unit or application on the first IT resource deployment optimization support screen 50 or the second IT resource deployment optimization support screen 60; however, the present invention is not limited to this example and the size of the first or second bubble 54, 64 may be decided according to a total amount of the storage capacity used by the relevant business unit or application, an average operating rate of a virtual machine used by the relevant business unit, or an average utilization rate of the storage used by the relevant business unit or application. Furthermore, the size of the first or second bubble 54, 64 may be displayed with the size according to the scale of an information processing system (the on-premises 2, the private cloud 3, or the public cloud 4) which provides the IT resources.

Moreover, the aforementioned embodiment has described the case where the business unit ID of the relevant business unit is displayed inside each first bubble 54 on the first IT resource deployment optimization support screen 50; however, the present invention is not limited to this example and the relevant business unit ID or the name may be displayed in the first bubble 45 when a mouse cursor is placed over the first bubble 54; and furthermore, other detailed information such as a specific value of the reducible cost may be displayed.

Furthermore, the aforementioned embodiment has described the case where the reducible cost is classified into three divisions and the relevant first or second bubbles 54, 64 are color-coded according to the respective divisions and displayed on the first and second IT resource deployment optimization support screens 50, 60; however, the present invention is not limited to this example and the reducible cost may be classified into two divisions or four or more divisions.

Furthermore, the aforementioned embodiment has described the case where the visualization unit 32A (FIG. 2) for the deployment location presentation unit 32 (FIG. 2) of the administrative server 5 expresses the reducible cost, the importance, and the total cost of the IT resources allocated to business units and applications by using the plane coordinates 53, 63 described earlier with reference to FIG. 9 to FIG. 11 or as the graphs described earlier with reference to FIG. 13 to FIG. 16; however, the present invention is not limited to this example and these pieces of information may be expressed in a numerical form and indicated in tables.

Furthermore, the aforementioned embodiment has described the case where the system ranks which are set to the respective applications in advance are applied as the importance of the applications; however, the present invention is not limited to this example and any index other than the above-described system ranks may be used as the importance of the applications.

INDUSTRIAL APPLICABILITY

The present invention can be applied to the IT resource deployment optimization support system for supporting the work to optimize the deployment of the IT resources allocated to business units.

REFERENCE SIGNS LIST

1: IT resource deployment optimization support system
2: on-premises
3: private cloud
4: public cloud
5: administrative server
7: external storage apparatus
11: CPU
12: memory
13: auxiliary storage apparatus
16: input apparatus
17: display apparatus
20: data acquisition program
21: IT resource deployment location candidate calculation program
22: deployment location presentation program
30: data acquisition unit
30A: IT resource configuration information acquisition unit
30B: IT resource performance information acquisition unit
31: IT resource deployment location candidate calculation unit
30A: IT resource configuration estimation unit
31C: IT resource configuration verification unit
32: deployment location presentation unit
32A: visualization unit
33: IT resource configuration information management table
34: IT resource performance information management table
35: IT resource menu information management table
36: on-premises asset information management table
37: IT resource deployment location candidate management table
38: deployment location summary information management table

50, 60: IT resource deployment optimization support screens
53, 63: plane coordinates
54, 64: bubbles
70, 80, 90: application detailed screens
71 to 73, 81, 82, 91, 92, 93: bar graphs

The invention claimed is:

1. A support apparatus for supporting work to optimize deployment of information processing resources respectively allocated to one or more allocation targets, the support apparatus comprising:
   a processer coupled to a memory storing instructions that when executed by the processor configure the processor to:
   calculate a deployment location candidate, which is a deployment location of each of the information processing resources allocated to each of the allocation targets, and a reducible cost when the information processing resource is allocated to the deployment location candidate, with respect to each information processing resource; and
   display on a display apparatus the reducible cost when the deployment of the information processing resource allocated to the allocation target is optimized, and an importance of the allocation target by associating the reducible cost with the importance of the allocation target with respect to each allocation target based on a result of the calculated reducible cost for each information processing resource.

2. The support apparatus according to claim 1, wherein the processor is furthered configured to
   acquire configuration information and performance information of each of the information processing resources, which is allocated to each of the allocation targets, from a corresponding one of an on premises resource, a private cloud resource and a public cloud resource that are capable of providing the information processing resources; and
   calculate the deployment location candidate and the reducible cost for each of the information processing resources on the basis of the acquired configuration information and the performance information of each of the information processing resources, and menu information of the information processing resources provided by each said of the on premises resource, the private cloud resource and the public cloud resource.

3. The support apparatus according to claim 1,
   wherein the processor is further configured to calculate an optimum configuration, in which an excess portion is reduced, with respect to each of the information processing resources, and
   calculate a deployment location in the calculated configuration as the deployment location candidate with respect to each of the information processing resources.

4. The support apparatus according to claim 3,
   wherein the processor is further configured to display on the display apparatus a first screen which includes plane coordinates with one axis representing the reducible cost and another axis representing the importance and in which each of objects associated with each of the allocation targets is drawn at a corresponding position on the plane coordinates.

5. The support apparatus according to claim 4,
   wherein each of the objects is of a circular shape and is displayed with a size according to a total cost of the information processing resource allocated to the allocation target or a system scale of the on premises resource, the private cloud resource and the public cloud resource which provides the information processing resource.

6. The support apparatus according to claim 5,
   wherein the processor is further configured to, when one of the objects is selected on the first screen, display on the display apparatus a second screen which displays at least one of: the reducible cost when the respective information processing resources allocated to the allocation target corresponding to the selected object are integrated in any one of the on premises resource, a private cloud resource and a public cloud resource; and
   calculate the reducible cost when each of the information processing resources allocated to the allocation target is optimized in the one of the on premises resource, a private cloud resource and a public cloud resource at present.

7. The support apparatus according to claim 6,
   wherein the processor is further configured to, when one of the reducible costs is selected on the second screen, display on the display apparatus a breakdown of the selected reducible cost.

8. A support method executed by a support apparatus for supporting work to optimize deployment of information processing resources respectively allocated to one or more allocation targets, the support method comprising:
   a first step of calculating a deployment location candidate, which is a deployment location of each of the information processing resources allocated to each of the allocation targets, and a reducible cost when the information processing resource is allocated to the deployment location candidate, with respect to each information processing resource; and
   a second step of displaying the reducible cost when the deployment of the information processing resource allocated to the allocation target is optimized, and an importance of the allocation target by associating the reducible cost with the importance of the allocation target with respect to each allocation target based on a result of the calculation of the reducible cost for each information processing resource.

9. The support method according to claim 8,
   wherein in the first step,
   configuration information and performance information of each of the information processing resources, which is allocated to each of the allocation targets, are acquired from a corresponding one of an on premises resource, a private cloud resource and a public cloud resource that are capable of providing the information processing resources; and
   wherein the deployment location candidate and the reducible cost for each of the information processing resources are calculated on the basis of the acquired configuration information and performance information of each of the information processing resources and menu information of the information processing resources provided by each said corresponding one of an on premises resource, a private cloud resource and a public cloud.

10. The support method according to claim 8,
    wherein in the first step, an optimum configuration, in which an excess portion is reduced, is calculated with respect to each of the information processing resources, and a deployment location in the calculated configuration is calculated as the deployment location candidate with respect to each of the information processing resources.

11. The support method according to claim 10,
wherein in the second step, a first screen which includes plane coordinates with one axis representing the reducible cost and another axis representing the importance and in which each of objects associated with each of the allocation targets is drawn at a corresponding position on the plane coordinates is displayed.

12. The support method according to claim 11,
wherein each of the objects is of a circular shape and is displayed with a size according to a total cost of the information processing resource allocated to the allocation target or a system scale of the on premises resource, a private cloud resource and a public cloud resource which provides the information processing resource.

13. The support method according to claim 12,
wherein in the second step, when one of the objects is selected on the first screen, a second screen is displayed, which displays at least one of: the reducible cost when the respective information processing resources allocated to the allocation target corresponding to the selected object are integrated in any one of the on premises resource, the private cloud resource and the public cloud information processing systems; and the reducible cost when each of the information processing resources allocated to the allocation target is optimized in the information processing system at present.

14. The support method according to claim 13,
wherein in the second step, when one of the reducible costs is selected on the second screen, a breakdown of the selected reducible cost is displayed.

* * * * *